United States Patent

Ohtsuka et al.

[11] Patent Number: 6,118,457
[45] Date of Patent: *Sep. 12, 2000

[54] RESOLUTION CONVERSION WITH PRESERVATION OF FINE LINES AND OF HUE

[75] Inventors: Naoji Ohtsuka, Yokohama; Atsushi Arai, Kawasaki; Kentaro Yano, Yokohama; Kiichiro Takahashi, Kawasaki; Osamu Iwasaki, Tokyo; Daigoro Kanematsu, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/794,459

[22] Filed: Feb. 4, 1997

Related U.S. Application Data

[63] Continuation of application No. 08/327,372, Oct. 21, 1994, abandoned.

[30] Foreign Application Priority Data

Oct. 28, 1993 [JP] Japan .................................. 5-270344

[51] Int. Cl.⁷ .................................................. G06T 15/00
[52] U.S. Cl. ........................................................... 345/434
[58] Field of Search ..................................... 395/126–135, 395/139, 426–435; 358/448, 450, 452–461, 530–536

[56] References Cited

U.S. PATENT DOCUMENTS

| | | | |
|---|---|---|---|
| 4,124,870 | 11/1978 | Schatz et al. | 358/260 |
| 4,698,778 | 10/1987 | Ito et al. | 395/139 |
| 4,918,622 | 4/1990 | Granger et al. | 395/132 |
| 5,200,839 | 4/1993 | Uchizono | 358/448 |
| 5,297,217 | 3/1994 | Hamilton, Jr. et al. | 382/296 |
| 5,394,252 | 2/1995 | Holladay et al. | 358/533 |

FOREIGN PATENT DOCUMENTS 5155040  6/1993  Japan .

*Primary Examiner*—Almis R. Jankus
*Attorney, Agent, or Firm*—Fitzpatrick, Cella, Harper & Scinto

[57] ABSTRACT

An image processing method and apparatus which prestore a mask pattern generated using a pseudo-random number in a ROM within the apparatus, and perform image data conversion using the mask pattern. This avoids overlap between the pixel pattern of the image data and the mask pattern in a large area, and conserves the respective color densities. Accordingly, the method and apparatus enable image processing conserving the color hue and tonality of the original image data.

26 Claims, 23 Drawing Sheets

FIG. 4
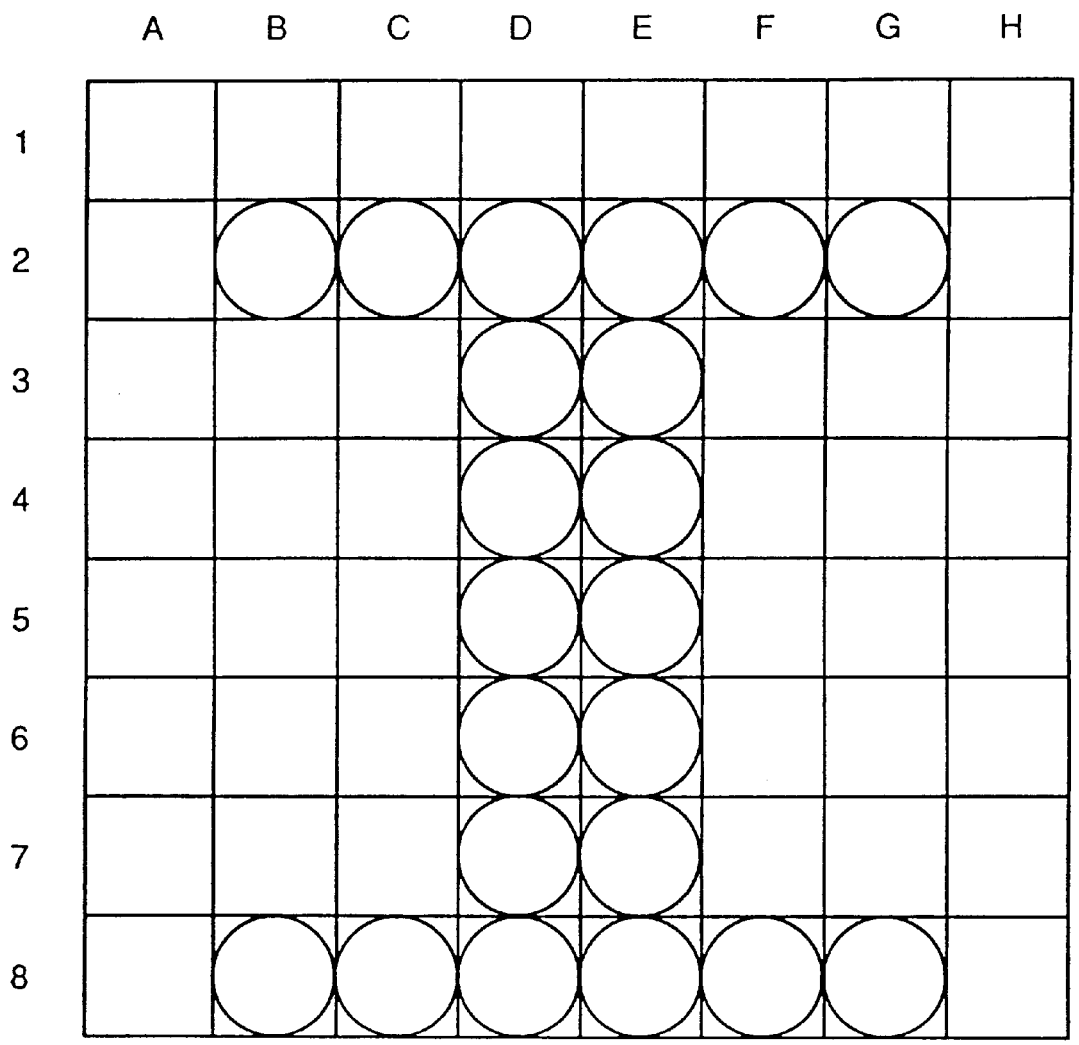
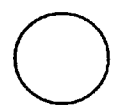 : VALID PIXEL

○ : VALID PIXEL

▨ : CELL THINNING POSITION

FIG. 6
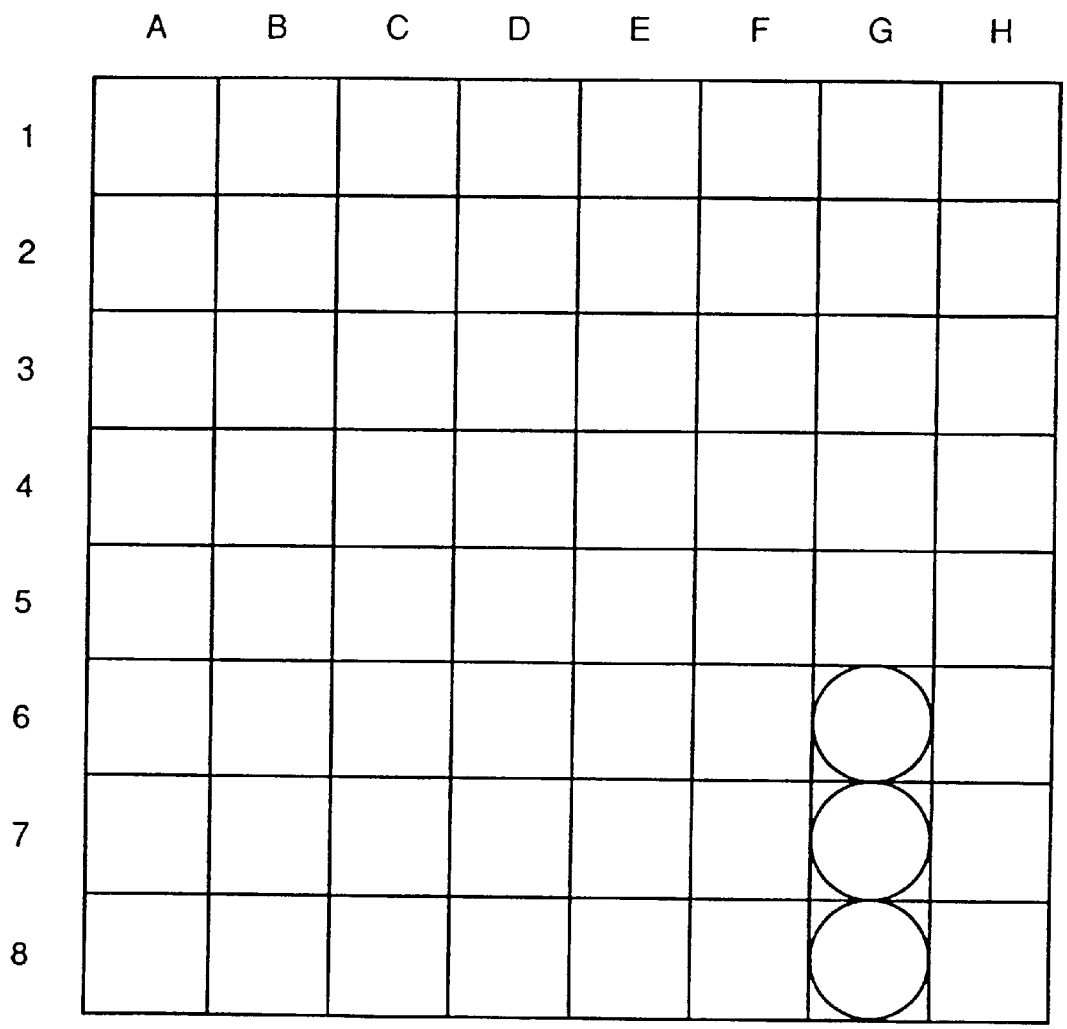
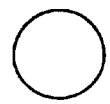 : VALID PIXEL

FIG. 8
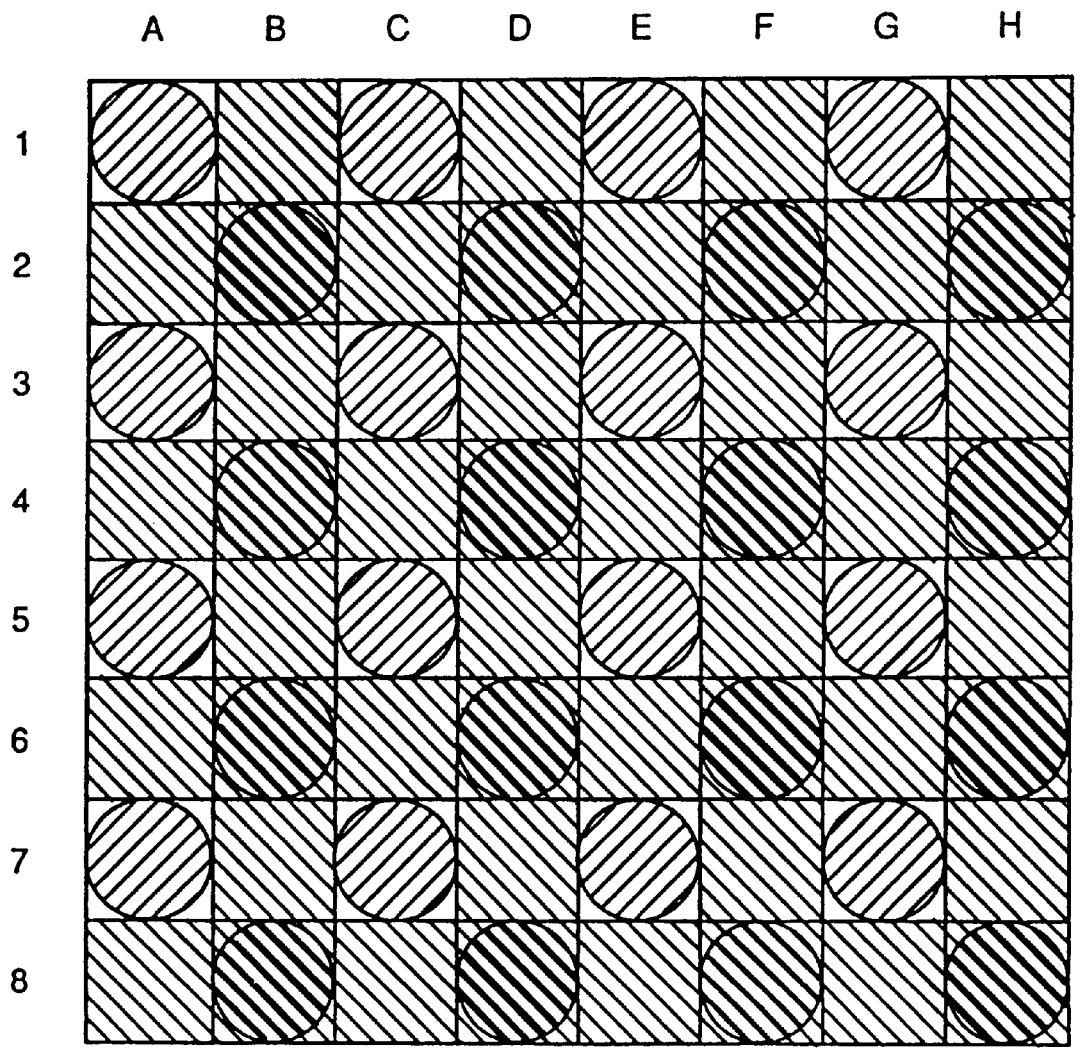
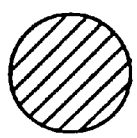 YELLOW  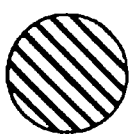 CYAN
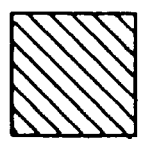 : CELL THINNING POSITION FIG. 9
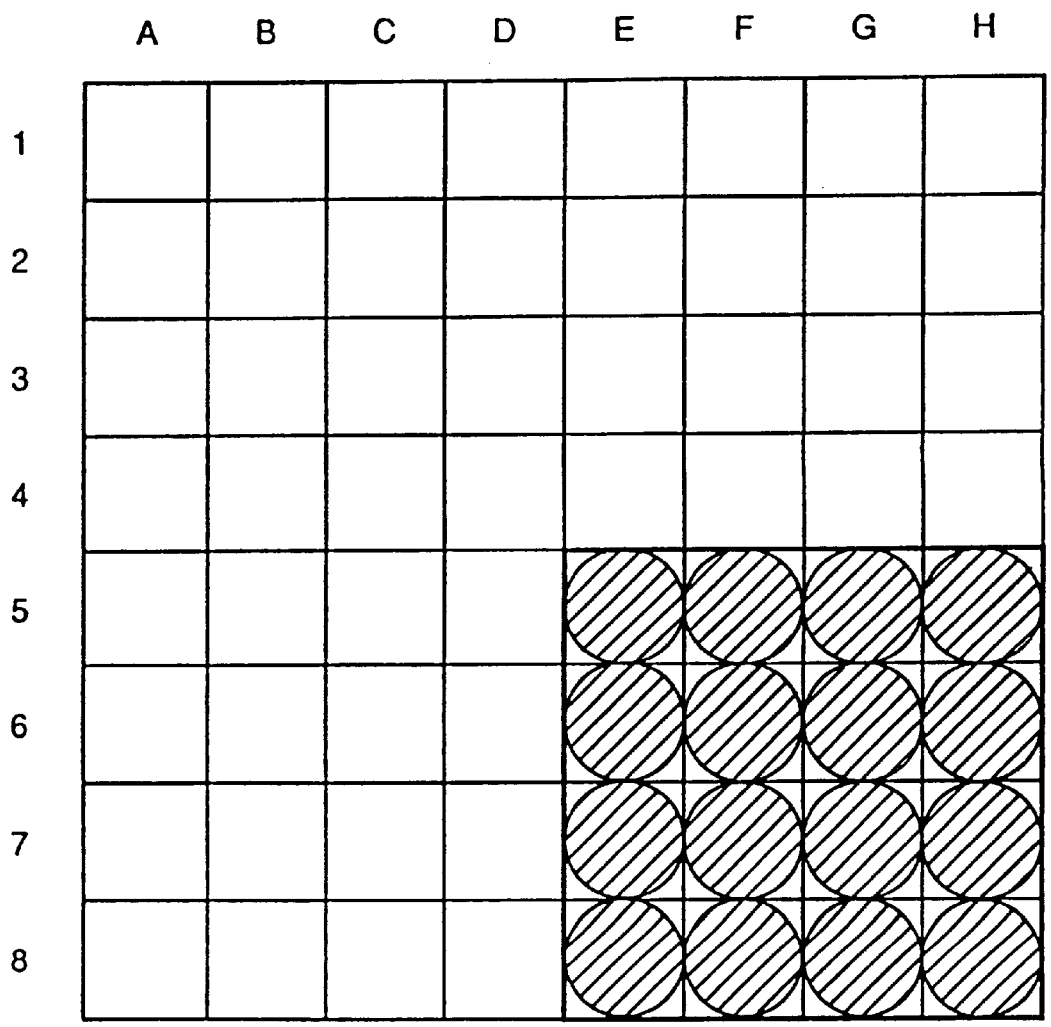
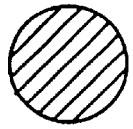
YELLOW FIG. 10
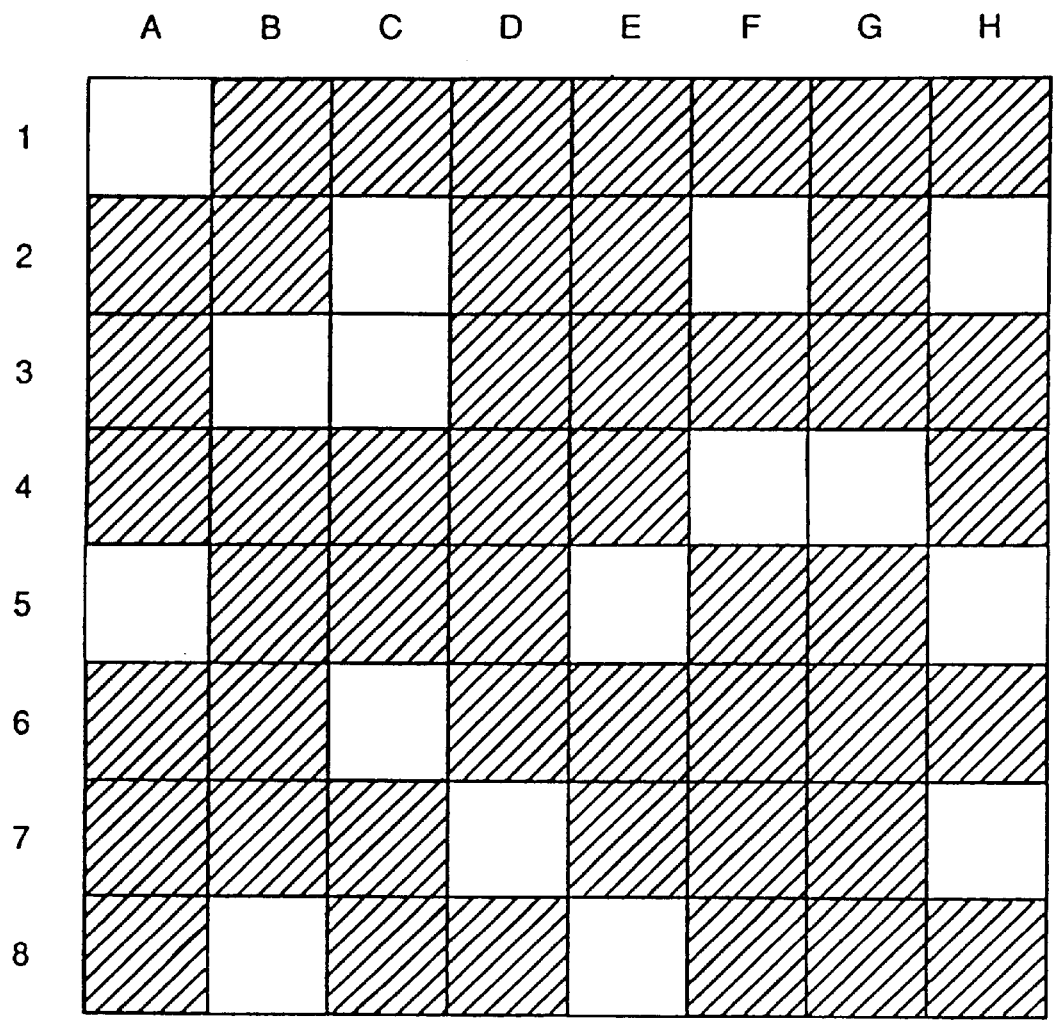
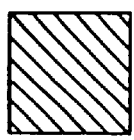 : CELL THINNING POSITION FIG. 11
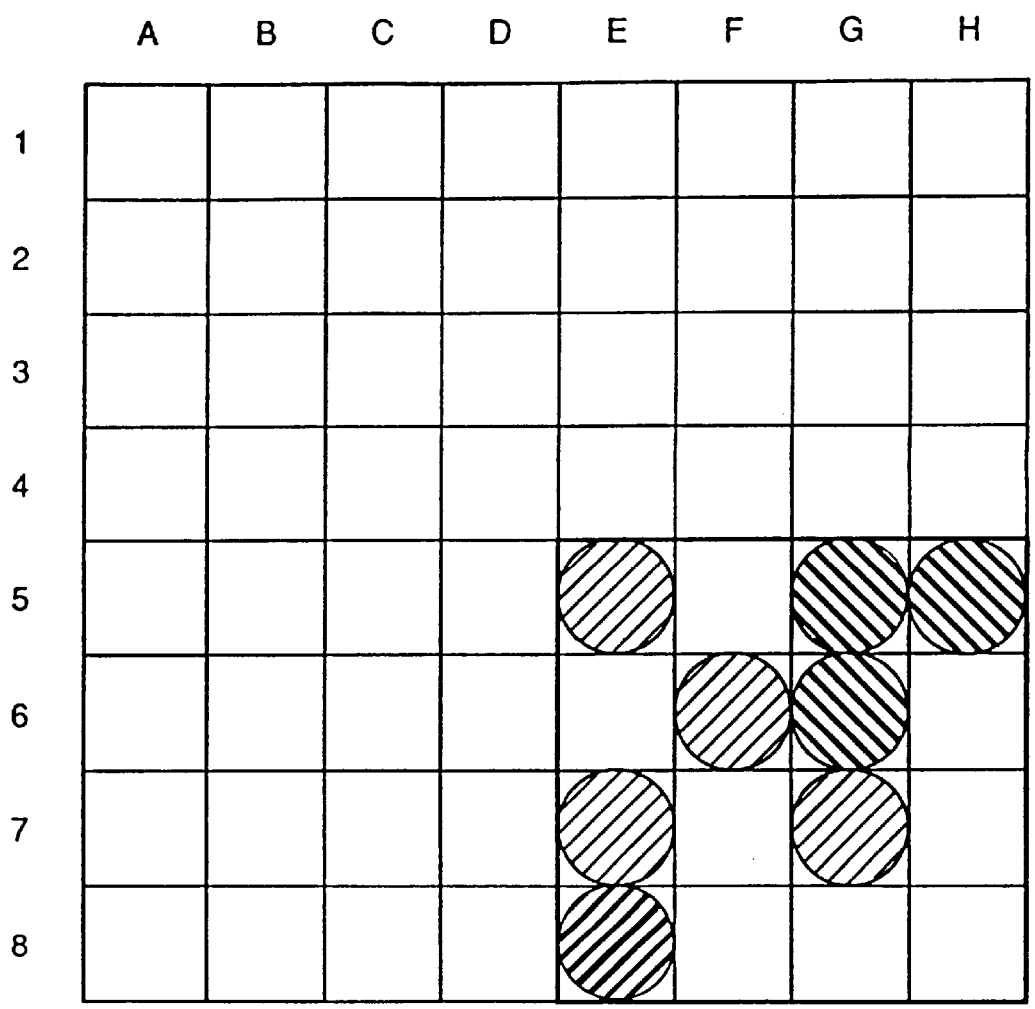
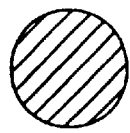
YELLOW
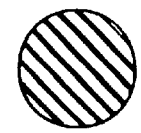
CYAN 160 dpi 360 dpi 160 dpi 360 dpi 160 dpi 360 dpi

RESOLUTION CONVERSION WITH PRESERVATION OF FINE LINES AND OF HUE

This application is a continuation of application Ser. No. 08/327,372 filed Oct. 21, 1994, now abandoned.

BACKGROUND OF THE INVENTION

The present invention relates to an image processing method and apparatus and, more particularly, to an image processing method and apparatus for enlarging/reducing image data and converting resolution.

Conventionally, in digital image processing systems, an image has been recorded on a recording medium in the form of a dot pattern.

Further, conventional image processing devices such as a printer, a copying machine and a facsimile machine have recorded a dot pattern image as an output image on recording material such as paper and a thin plastic film.

Such image processing devices are divided into ink-jet printing type devices, wire-dot printing type devices, thermal printing type devices, laser-beam printing type devices and the like, depending upon printing method. The ink-jet printing type printer discharges ink droplets from the discharging orifices of a printing head and fixes the discharged ink on to a recording material.

Recent popularization of such image processing devices has raised needs for high-speed recording, high resolution, high image quality, lower noise and so on. Further, color ink-jet printing has been quickly developed.

Moreover, as high-level functions of the image processing devices have been developed, techniques such as image enlargement/reduction processing and resolution conversion have been greatly improved.

However, the above conventional devices have the following drawbacks:

(1) As high-level image-processing functions are developed, algorithms for such processings become complicated. As a result, processing speeds are lowered to a great extent. Conversely, in a case where image processing performance is suppressed for the purpose of maintaining a high processing speed, problems regarding image quality, e.g., lack of thin lines within an image or change of color hue upon image enlargement/reduction due to a change of color-representing pattern have occurred.

(2) Upon resolution conversion, more serious problems have occurred. For example, regular thinning, such as the technique of thinning one dot from a predetermined number of dots, has changed the overall color hue of an image, and further generated a texture of different color hue.

Since no general solution to these problems have been provided, users have to adjust various processing parameters in accordance with the particular image to be processed.

Such adjustment greatly depends upon the user's ability, and therefore, the users require must be skilled in the adjusting technique.

SUMMARY OF THE INVENTION

Accordingly, it is an object of the present invention to provide an image processing method and apparatus which enables image processing maintaining the color hue and tonality of an original image without complicated processing.

It is another object of the present invention to provide an image processing method and apparatus which enable image processing maintaining the color hue and tonality of image data by enlarging/reducing and resolution conversion using a pseudo-random-number mask pattern to maintain respective color densities.

It is another object of the present invention to provide an image processing method and apparatus which enable high-speed image processing excellent in thin-line maintainability, tonality and color hue maintainability by processing thin-line/outline portions and other portions separately, i.e., using appropriate image reduction methods, a method completely maintaining the thin lines or outline in the thin-line/outline portions and a method conserving the color densities in these various portions.

It is another object of the present invention to provide an image processing method and apparatus which enable an image reduction method further maintaining tonality in image recording based on a method for representing halftone by density change such as a multi-dot printing method or a printing method using inks of different densities.

It is another object of the present invention to provide an image processing method and apparatus which do not require image adjustment by a skilled operator.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates an original image before image reduction;

FIG. 6 illustrates a reduced image that lacks the original image;

FIG. 8 illustrates the half-tone image data with the regular mask pattern;

FIG. 9 illustrates a result of image reduction of the halftone image of the first embodiment with the regular mask pattern;

FIG. 10 illustrates a mask pattern generated using a pseudo-random number according to the first embodiment;

FIG. 11 illustrates a result of image reduction of the halftone image of the first embodiment with the mask pattern in FIG. 10;

DETAILED DESCRIPTION OF THE PREFERRED EMBODIMENTS

The preferred embodiments of the present invention will be described in detail in accordance with the accompanying drawings.

[First Embodiment]

FIGS. 2A to 2C and 3A to 3C show image enlargement/reduction with respect to character data and thin line data. Preferably, the original image should be enlarged or reduced without deformation or deletions therefrom, as shown in FIGS. 2A to 2C and 3A to 3C.

In reduction, a simple method, e.g., thinning pixels of the original image at predetermined periods, may be employed. However, in such method, as the reduction ratio is raised, thin lines appearing in a reduced image increase, and thin vertical and horizontal lines in the original disappear from the reduced image.

An example of such disappearance of vertical and horizontal lines will be described with reference to FIGS. 4 to 6.

In FIG. 4, image reduction is performed on a binary image. Note that in FIGS. 4 to 6, each cell represents one pixel; a cell including a mark "O" indicates a black pixel and a cell with no mark "O" indicates a white pixel. Hereinafter, a black pixel will be referred to as a "valid" pixel.

Figure 5:
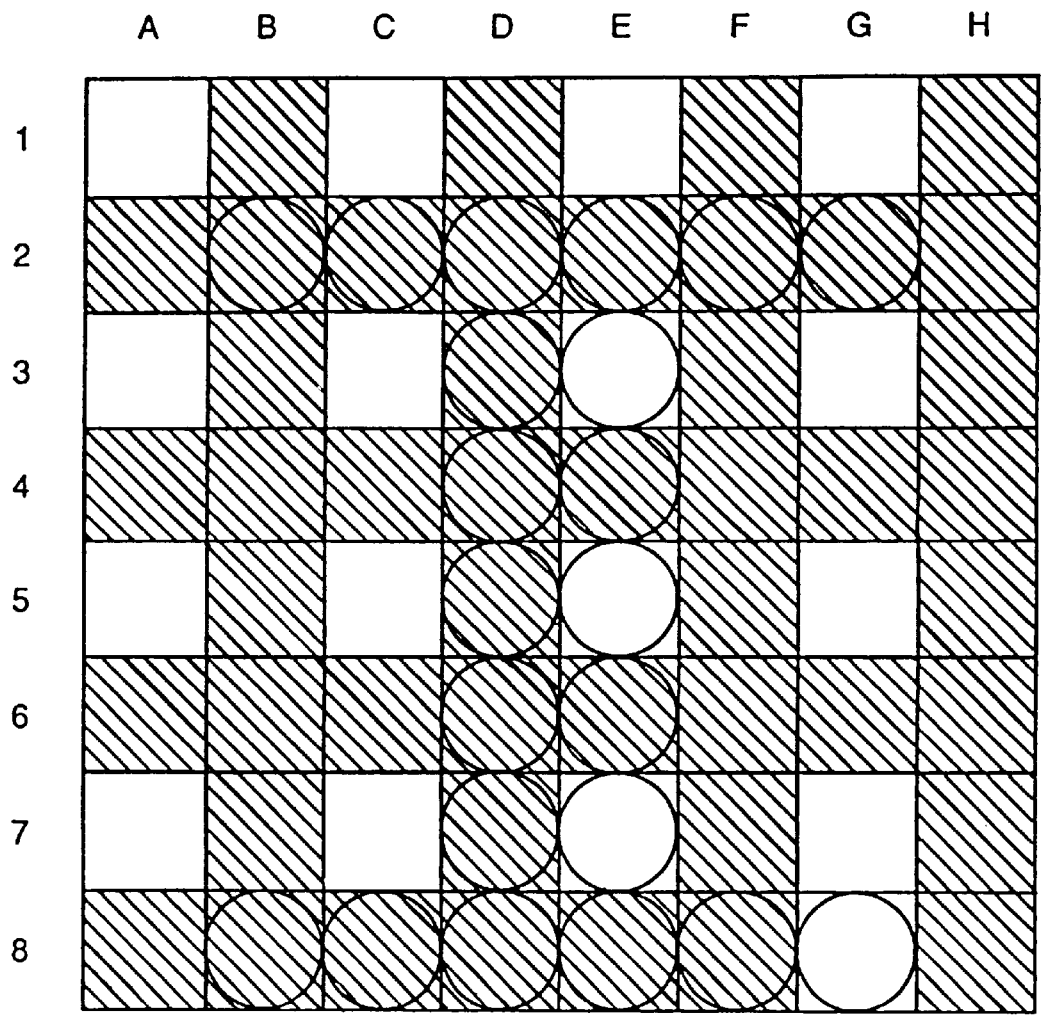
FIG. 5 illustrates a regular mask pattern.

If reduction is performed on the image in FIG. 4 using the regular mask pattern shown in FIG. 5, portions overlapped with the mask pattern disappear. As a result, a reduced output image is as shown in FIG. 6, i.e., the original image in FIG. 4 is no longer recognizable. Note that reduced image is rearranged at a right-bottom position of the block. In this example, it is conceivable that all valid pixels may disappear, depending upon the original image and the mask pattern.

Generally, in image processing using regular patterns such as hatch patterns and dither patterns, peripheral image data are OR-processed to avoid omission of valid pixel in image reduction.

However, the repetition of such processing increases data processing time tremendously. Further, the mask size may change depending upon the reduction ratio, which prolongs processing time and increases the amount of processing data.

In this embodiment, to solve the above problems, a mask pattern for enlargement/reduction, especially for image reduction, is generated using a pseudo-random number.

Also generally, if image reduction is performed on a halftone image, the density of the original image may change to a great extent. However, the image reduction according to the present embodiment avoids degradation of halftone tonality of the original image.

The image reduction according to the present embodiment will be described below with reference to FIG. 1.

Figure 1:
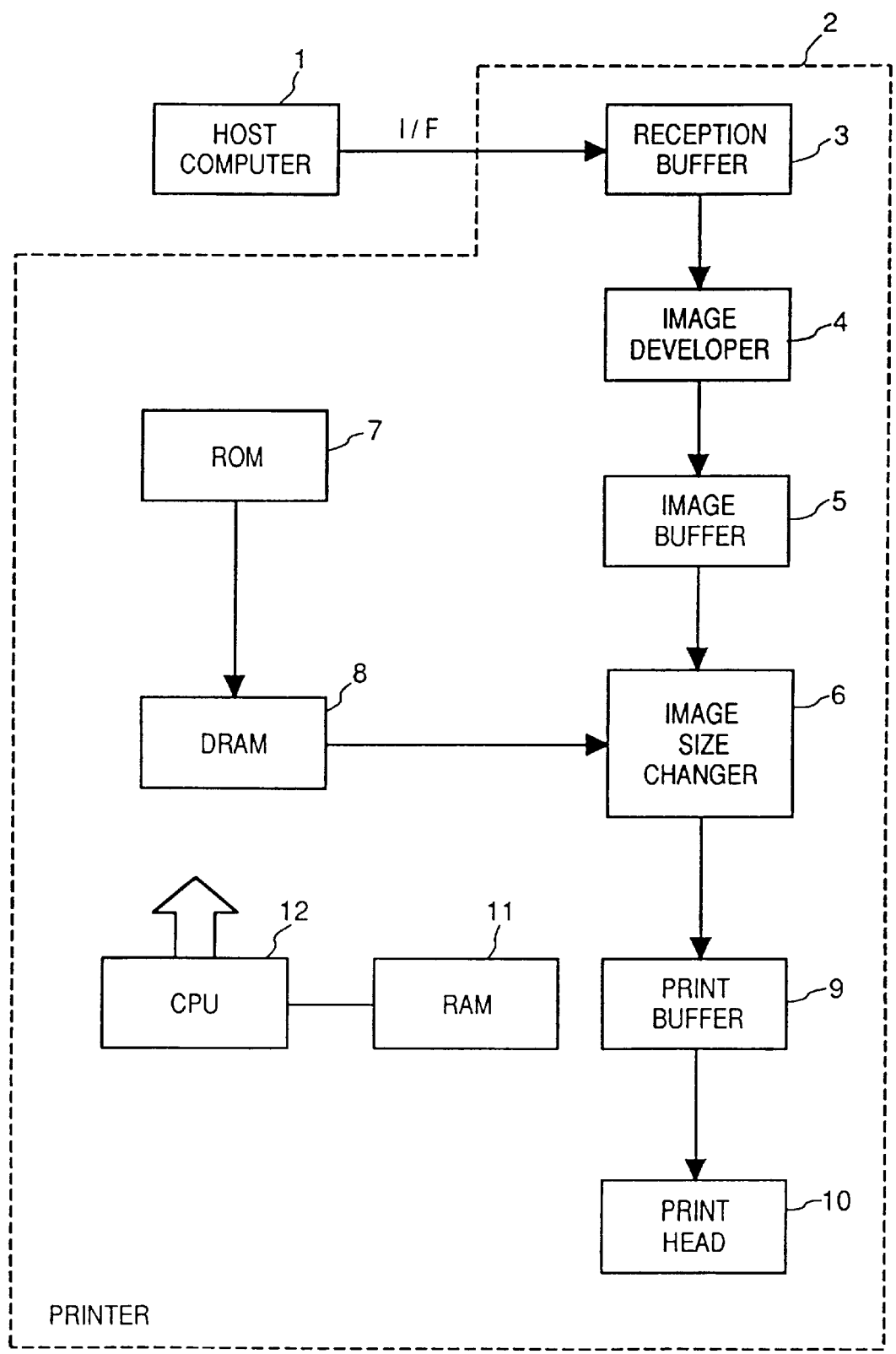
FIG. 1 is a block diagram showing the configuration of an image processing apparatus according to a first embodiment of the present invention.
Figure 2A:
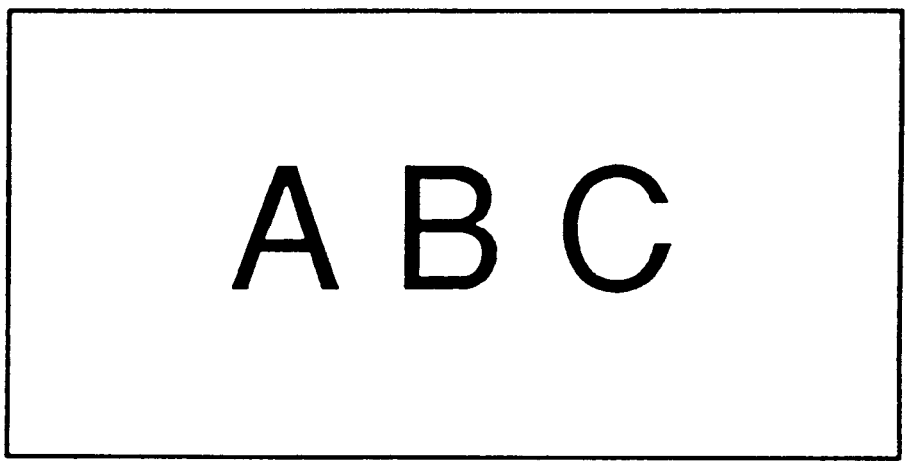
FIGS. 2A to 2C illustrate the enlargement/reduction of a character image.
Figure 2B:
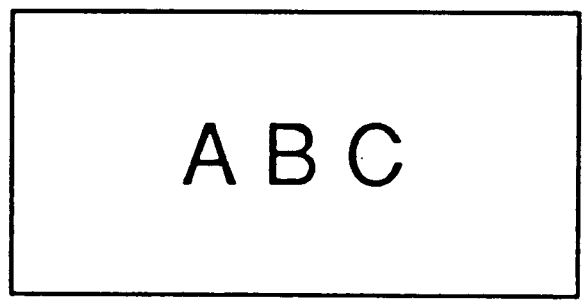
Figure 2C:
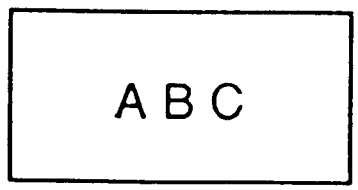
Figure 3A:
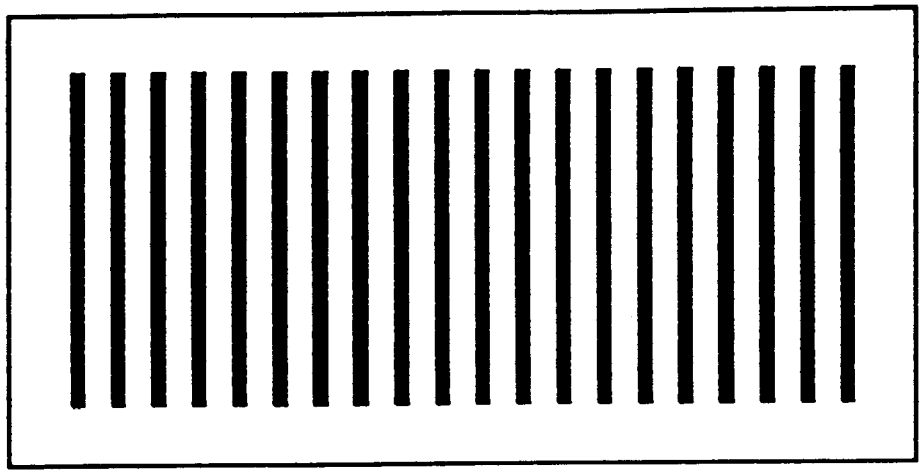
FIGS. 3A to 3C illustrate the enlargement/reduction of a thin-line image.
Figure 3B:
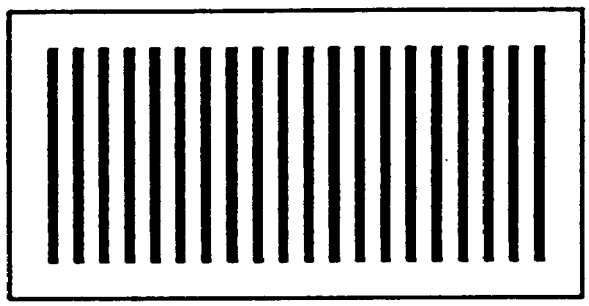
Figure 3C:
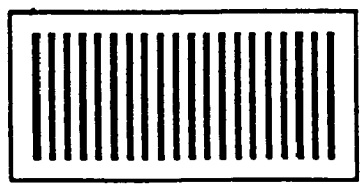

FIG. 1 is a block diagram showing the configuration of a printer which is capable of the reduction processing of this embodiment. In FIG. 1, reference numeral 1 denotes a host computer; and 2, a printer comprising a reception buffer 3, image developer 4 for interpreting commands and developing image data, an image buffer 5, an image size changer 6, a ROM 7, a DRAM 8, a print buffer 9 and a print head 10. These elements of the printer 2 are controlled by a CPU 12 (this is indicated by the large arrow emerging from the upper side of the box representing the CPU 12). A RAM 11 is used as a work area for the CPU 12. Though not described in detail, mask patterns used in the reduction of the present embodiment are stored in the ROM 7.

First, a control code and image data are transferred from the host computer 1 via an interface to the printer 2. The printer 2 receives the control code and the image data from the host computer 1 by the reception buffer 3, next, interprets the control code by the image developer 4, then based on the interpreted result, performs processing/development on the image data for printing by the print head 10, and outputs the processed/developed image data to the image buffer 5.

When image enlargement/reduction is not performed, the image data stored in the image buffer 5 is passed through the image size changer 6 and the print buffer 9, and is outputted to the print head 10 where printing is performed based on the data. On the other hand, when image enlargement/reduction is performed, the image size changer 6 performs necessary enlarging/reduction processing, then stores the enlarged/reduced image data into the print buffer 9, and outputs the image data to the print head 10 for printing. The image enlargement/reduction by the image size changer 6 will be described below.

The image size changer 6, comprising a gate array, performs AND processing between the image data transferred from the image buffer 5 and mask pattern data transferred from the DRAM 8 and outputs the result of the AND processing to the print buffer 9.

Note that the mask pattern data in the DRAM 8 is stored in the ROM 7 in advance. The mask pattern data in the ROM 7 is transferred to the DRAM 8 by direct memory access (DMA) transfer. As described later, the mask pattern data is generated using a pseudo-random number.

In the image size changer 6, output of image data to the print buffer 9 is made by re-setting an address of the image data in the image buffer 5 or controlling transfer timing of transmitting data from the image buffer 5 to the print head 10 in accordance with the state of the mask pattern data from the DRAM 8. Thus, in this embodiment, the omission of thin lines within the image data can be avoided.

The above description has been made with respect to processing for monochromatic images. For color image processing, 8×8 or 16×16 matrix mask patterns for Y (yellow), M (magenta), C (cyan) and K (black) color informations may be stored in the ROM 7 in advance.

Upon enlargement/reduction or resolution conversion in color image recording, the same mask pattern may be applied to respective Y, M, C and K color information;

otherwise, different mask patterns may be employed. In both cases, basically, the mask pattern should have the same number of dots to be thinned in the raster direction and the column direction in accordance with the enlargement/reduction ratio or resolution conversion ratio with respect to an original image data.

However, in both cases, the mask pattern is a regular pattern, and accordingly, the masking cannot avoid occurrence of a portion that overlaps the color representation pattern such as the dither pattern. This may cause partial change in the color of a processed image. In an extreme example, the printing density may change from 50% to 100%.

An example of such printing density change will be described with reference to FIG. 7.

Figure 7:
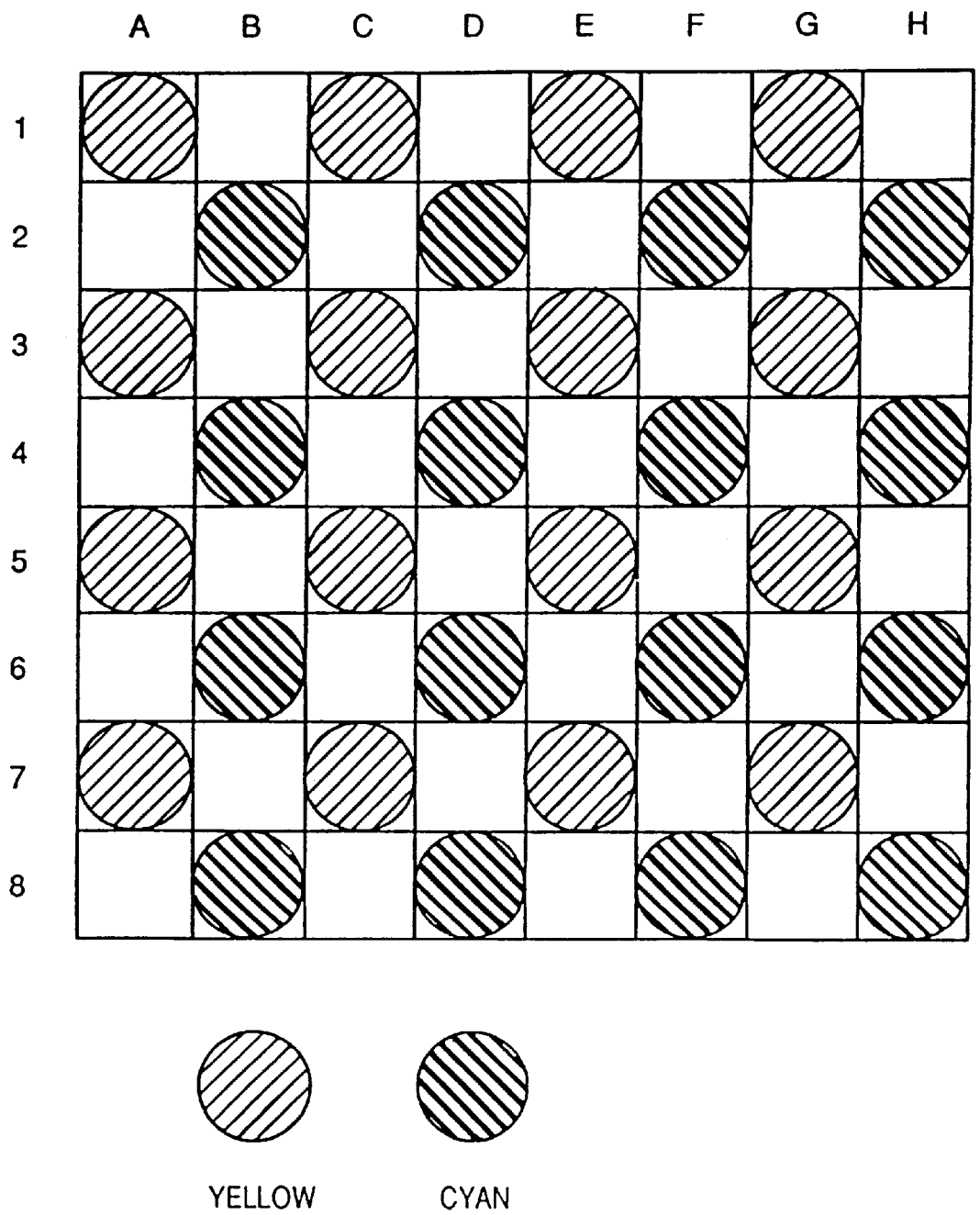
FIG. 7 illustrates half-tone image data according to the first embodiment.

FIG. 7 shows an 8×8 image data representing a green halftone image by 25% of yellow and 25% of cyan.

In FIG. 7, the yellow color information and cyan color information are arranged every other dot in the raster and column directions as a regular pattern. In this example, this image data is reduced to have the size ¼ of the initial size by reducing the image lengths in the raster and column directions to ½.

In FIG. 7, if a regular grid pattern mask as shown in FIG. 8 (hatched cell) is used to thin the dot arrangement of the image data, the dots overlapped with the mask pattern are thinned.

FIG. 9 shows the rearrangement of the dots left from the thinning using the mask pattern in FIG. 8. In the image data, the residual dots are assigned to the reduced image area.

In FIG. 9, all the residual dots are yellow dots, since the mask pattern in FIG. 8 completely overlaps to the cyan dots and blank portions of the data in FIG. 7. As a result, the reduced image in FIG. 9 is an image of 100% of yellow, utterly different from the green original image.

In FIG. 8, if the mask pattern is shifted by one dot in the raster and column directions, the reduced image becomes an image of 100% of cyan.

As in the above extreme example, considerable color change in an image after thinning often occurs due to overlap between a mask pattern and a masked image data.

As described above, to prevent such color change caused by the overlap between a mask pattern and a masked image data upon image reduction, the present embodiment employs a mask pattern generated using a pseudo-random number. The reduction processing according to the present embodiment performs AND processing between a mask pattern generated using a pseudo-random number and an image data with a thinning ratio in accordance with a reduction ratio and obtains a reduced image. Note that while in principle a random number might be used for generating a mask for enlargement/reduction or resolution conversion such need not always be a completely random number, and actually, a function for generating a "random" number and the like may be used. Accordingly, in this embodiment, when a mask for enlargement/reduction or resolution conversion is to be generated using a random number, a pseudo-random number is actually employed. Note that a mask pattern used in this embodiment is a pattern where the number of dots in a raster direction and that in a column direction are the same. Accordingly, in the present embodiment, no overlap between the original image data and the mask pattern occurs. Thus, the reduced image contains respective colors of conserved density including blank ratio, therefore, even though color hue has subtly changed, any considerable color change can be avoided.

Next, the reduction processing according to the present embodiment will be described with reference to FIGS. 10 and 7.

FIG. 10 shows a mask pattern used in this embodiment. Note that in FIG. 10, a hatched cell represents a position to thin a dot.

The mask pattern of this embodiment is generated by selecting one dot from a 2×2 dot block by a pseudo-random number.

In FIG. 10, references A to H are given to the 8×8 dot block in the column direction every other dot, and numerals 1 to 8 are given in the raster direction every other dot. Then, two adjacent dots m, n in the column or raster direction are represented by (m·n), and the dot positions l in the column direction and r in the raster direction are represented by (l,r). In FIG. 10, in the 2×2 blocks represented by (A·B)×(1·2), a position (A, 1) is selected, then in the next 2×2 blocks (C·D)×(1·2), a position (C, 2) is selected. In this manner, an extracted dot position is selected at the rate of one dot per four dots using pseudo- random numbers. This random selection/extraction is repeated until the completion of the mask pattern in FIG. 10.

Note that the mask pattern in FIG. 10 is an 8×8 dot block; however, in actual reduction processing, a mask pattern is a comparatively large size for, e.g., one image screen, one page or one scanning length. In a case where the printer 2 of the present embodiment is a serial printer, the raster direction of the mask pattern may have a size corresponding to the nozzle width printable by the print head 10 by one scanning in the raster direction and several hundred columns in the column direction.

FIG. 11 shows the result of reduction of the image data in FIG. 7 using the mask pattern in FIG. 10. In FIG. 11, the extracted dots or bank portions are rearranged in the reduced range.

The number of dots of the respective colors are four yellow dots, four cyan dots and eight blank dots. The color constructing ratio of these respective color dots is 4:4:8, i.e., 1:1:2. As the color dot ratio of the original image data in FIG. 7 is 16:16:32, the reduced image has the same ratio. Accordingly, the reduced image has the same yellow, cyan and blank ratio as that of the original image in FIG. 7; that is, the color hue and color density are conserved 100% in the reduced image.

Note that the above example shows the reduction result where the color dot ratio is the same as that of the original image; however, in actual printing, every reduction does not result in the same color dot ratio as that of the original image. A reduced image may have an area where the color hue and density have subtly changed depending upon the mask pattern. However, as a mask pattern is generated using pseudo-random numbers, the color hue and density of the overall image can be conserved.

Further, this embodiment prevents extreme overlap between a mask pattern and image data in a large area, it can provide a reduced image of well-conserved color hue and density.

Figure 20:
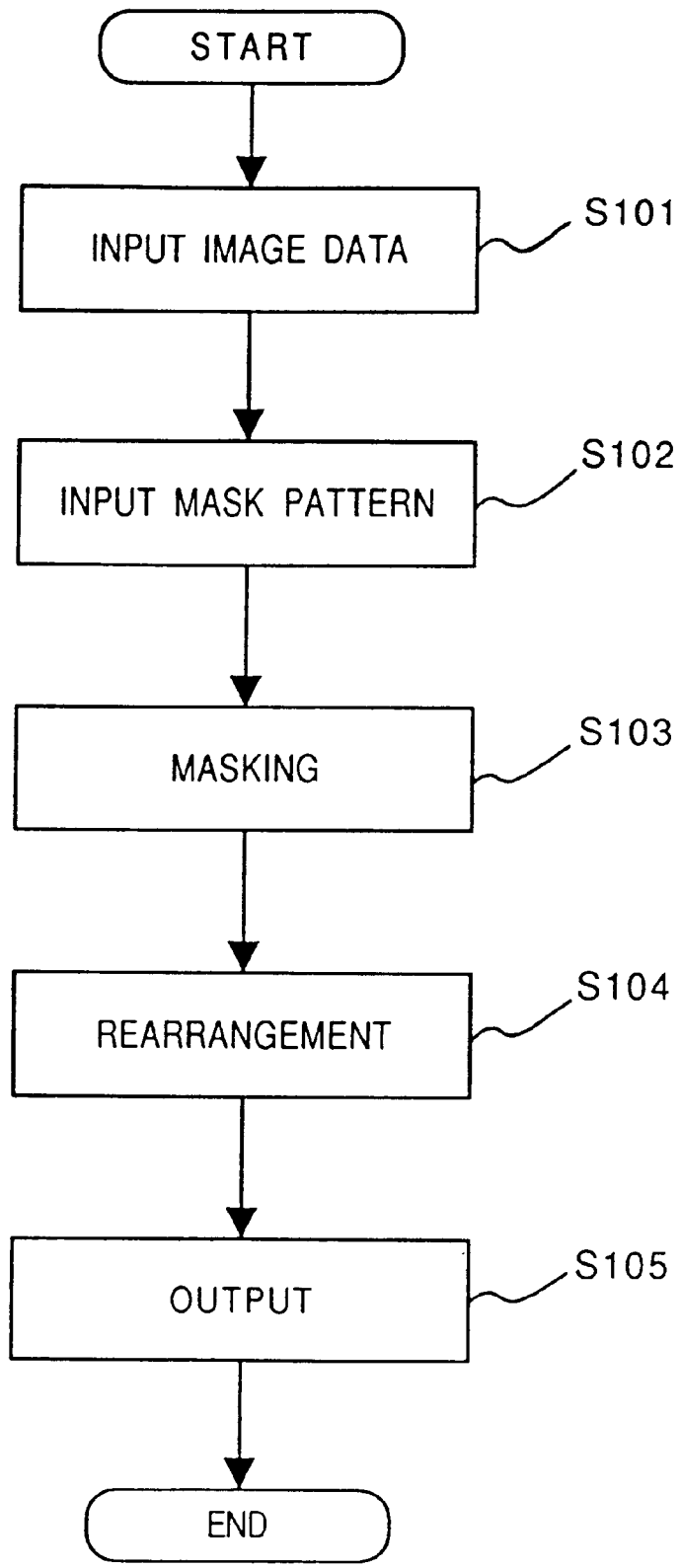
FIG. 20 is a flowchart showing the image reduction according to the first embodiment.

FIG. 20 is a flowchart showing the reduction processing according to the present embodiment. In step S101, image data to be subjected to the reduction is inputted from the host computer 1 to the reception buffer 3. The data is developed into image data of a predetermined format (FIG. 7) by the image developer 4 and stored into the image buffer 5. Next, in step S102, a mask pattern (FIG. 10) stored in the ROM 7 is transferred to the DRAM 8. In step S103, masking is performed by the image size changer 6, and in step S104, the extracted dots are rearranged (FIG. 11), and the data is outputted to the print buffer 9. The image data in the print buffer 9 is outputted to the print head 10 in step S105.

Note that in the present embodiment, the mask pattern is pre-stored in the ROM 7; however, the present embodiment is not limited to this construction. For example, the construction shown in FIG. 19 may be employed.

Figure 19:
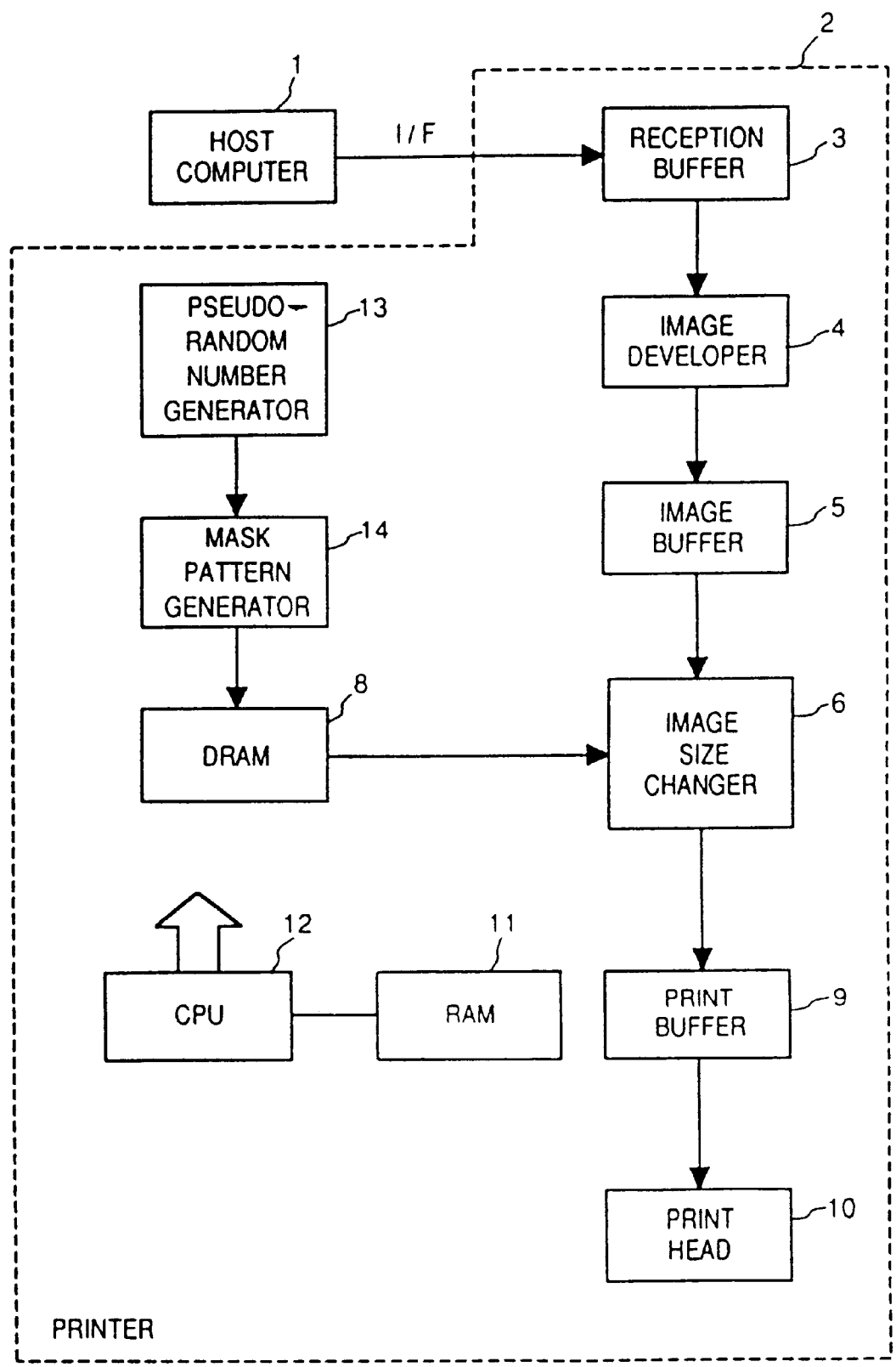
FIG. 19 is a block diagram showing another configuration of the apparatus according to the first embodiment.

In FIG. 19, the elements corresponding to those in FIG. 1 have the same reference numerals, and the explanations of these elements will be omitted. Numeral 13 denotes a pseudo-random number generator; and 14, a mask pattern generator. When reduction processing starts, the pseudo-random number generator 13 generates a pseudo-random number at predetermined timing. The mask pattern generator 14 generates a mask pattern based on a designated reduction ratio using the pseudo-random numbers generated by the pseudo-random number generator 13, and transfers the mask pattern to the DRAM 8. Then masking follows in the above-described manner.

As described above, as a mask pattern is generated within the apparatus, pre-storing of various mask patterns in the ROM 7 as shown in FIG. 1 is unnecessary.

Figure 21:
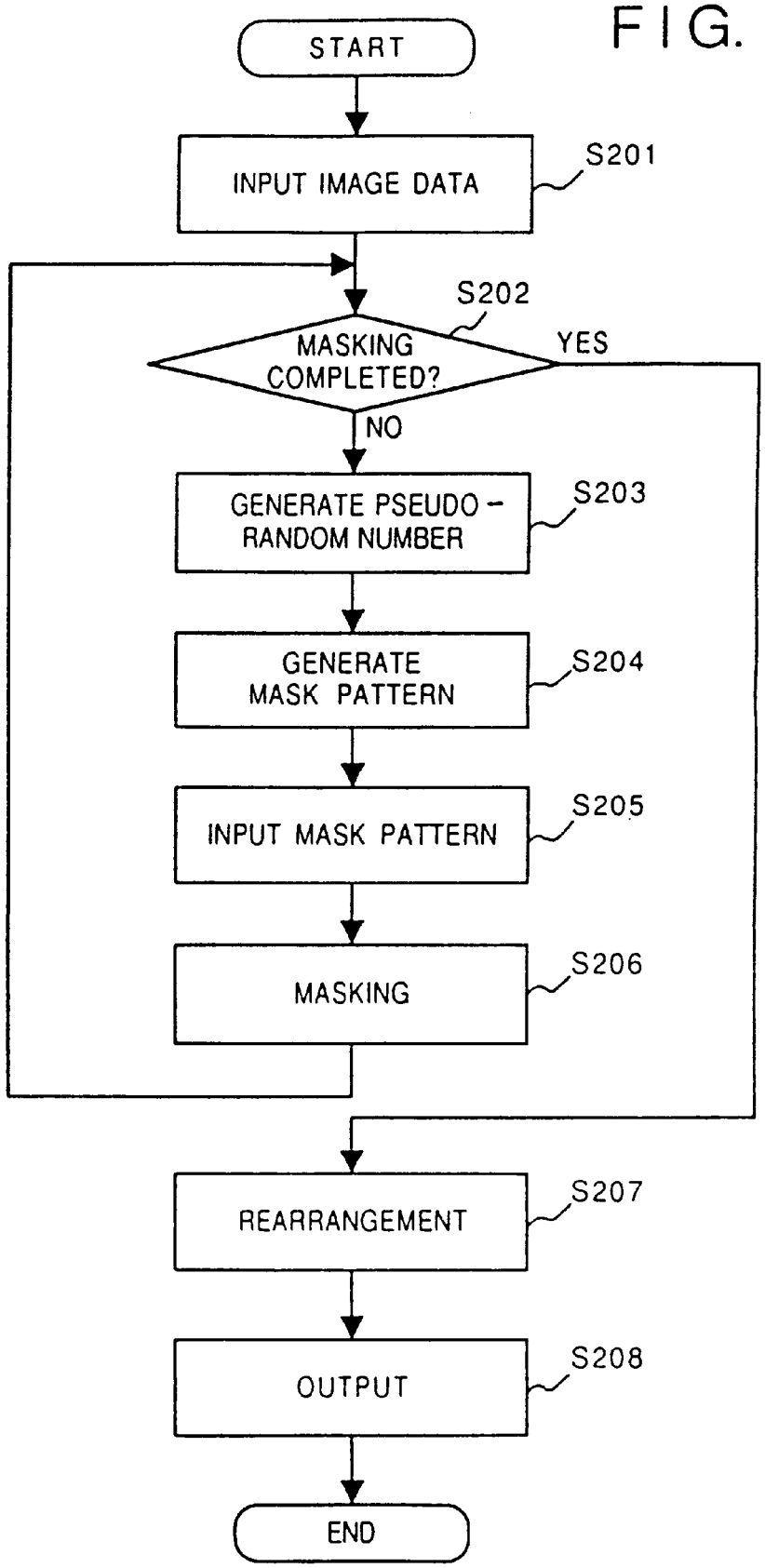
FIG. 21 is a flowchart showing image reduction by the image processing apparatus in FIG. 19 according to the first embodiment.

FIG. 21 is a flowchart showing the reduction processing by the construction in FIG. 19. In step S201, image data is developed in the image buffer 5. In step S202, whether or not masking processing upon the overall image data has been completed is determined. If NO, the process proceeds to step S203. In step S203, pseudo-random number are generated by the pseudo-random number generator 12, and in step S204, a mask pattern of a predetermined size is generated by the mask pattern generator 13 using the pseudo-random numbers. In step S205, the mask pattern generated in step S204 is transferred to the DRAM 8, and in step S206, masking is performed by the image size changer 6. Then the process returns to step S202 to repeat the above operations until the masking is completed with respect to the overall image data stored in the image buffer 5.

In step S202, if it is determined that the masking has been completed, the process proceeds to step S207, in which the extracted dots are rearranged and outputted to the print buffer 9. In step S208, the image data stored in the print buffer 9 is outputted to the print head 10.

As described above, according to the present embodiment, color original image data is thinned by a mask pattern generated using pseudo-random numbers. This conserves respective color densities, and enables image processing conserving the color hue and tonality of the original image data.

[Second Embodiment]

In addition to the image processing method as described in the first embodiment, a second embodiment of the present invention provides image reduction where thin line maintainability is considered.

Hereinbelow, mask pattern generation for reducing an original image into a ¼, i.e. reducing the raster directional length and the column directional length of the image into a ½ and a thinning algorithm will be described.

In the second embodiment, the minimum unit of printing is one dot corresponding to the constructing unit of a mask-pattern generated using a pseudo-random number. Accordingly, if a gray-scale image data generated based on the minimum printing unit of the print head 10 is masked with a mask pattern of one-dot constructing unit, some part of the image might correspond with the frequency of the pseudo-random number.

Such overlap between the mask pattern and the image portion changes a thin line to a dotted line or a zigzag line, or even deletes the thin line due to continuous deletion of dots or continuous residual dots. In full-color image printing, influences in color representation by a mask pattern is greater than the changes of thin lines, and the change of thin lines is negligible. However, in printing of fine monochromatic images such as business graphics and texts, problems caused by the changes of thin lines are very serious. Therefore, thin-line maintainability and its precision are especially important in the latter type of printing.

Figure 17:
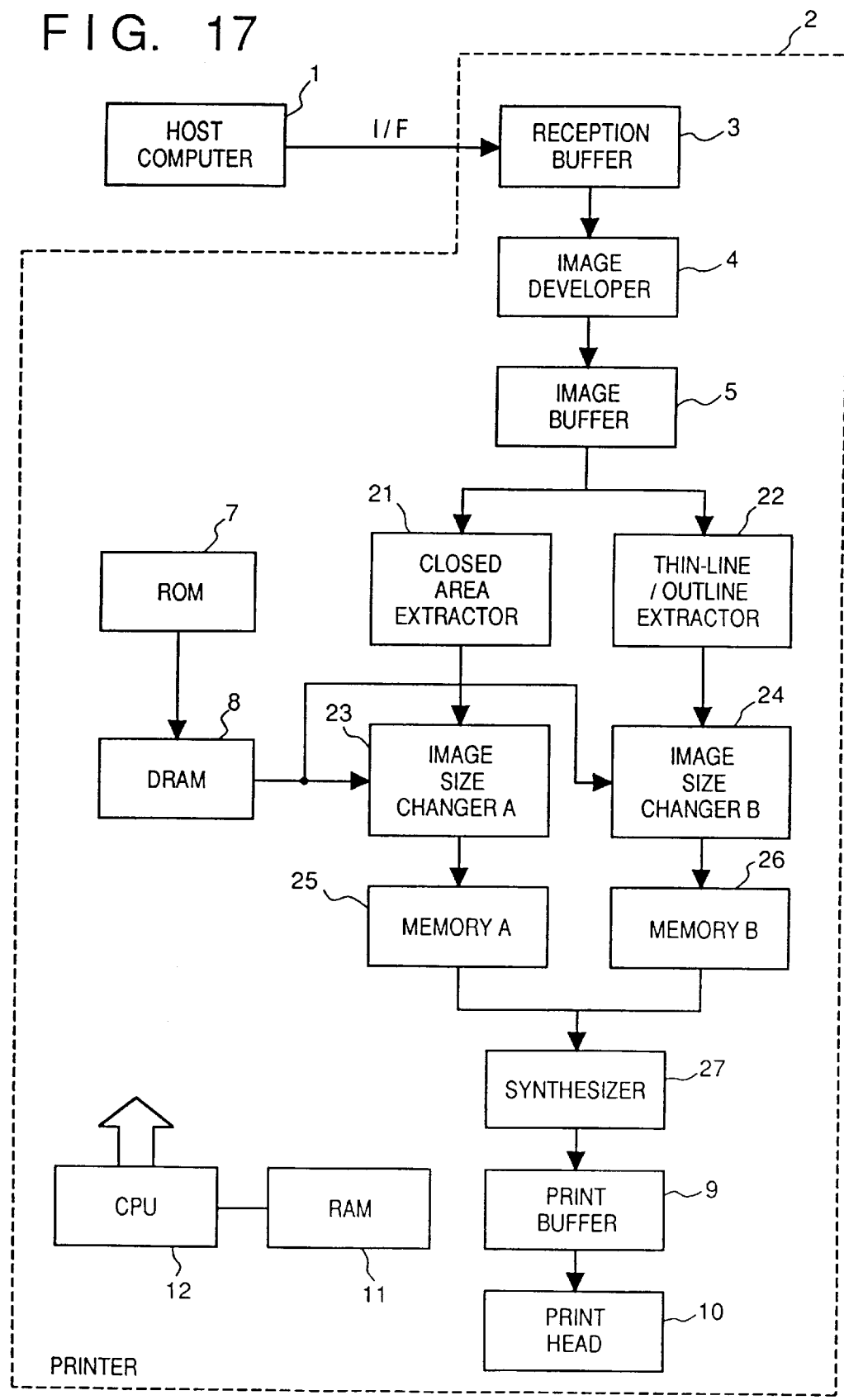
FIG. 17 is a block diagram showing the configuration of an image processing apparatus according to the second embodiment.

FIG. 17 shows the configuration of a printer according to a second embodiment. In FIG. 17, the elements corresponding to those in FIG. 1 of the first embodiment have the same reference numerals and the explanations of these elements will be omitted. In FIG. 17, numeral 21 denotes a closed area extractor for extracting an area surrounded by an outline portion; 22, a thin-line/outline extractor for extracting a thin line portion and an outline portion; 23 and 24, image size changes A and B; 25 and 26, memories A and B; and 27, a synthesizer.

Next, the reduction processing according to the second embodiment having the above construction will be described in detail with reference to FIGS. 12A to 12C and FIGS. 13A to 13D.

Figure 12A:
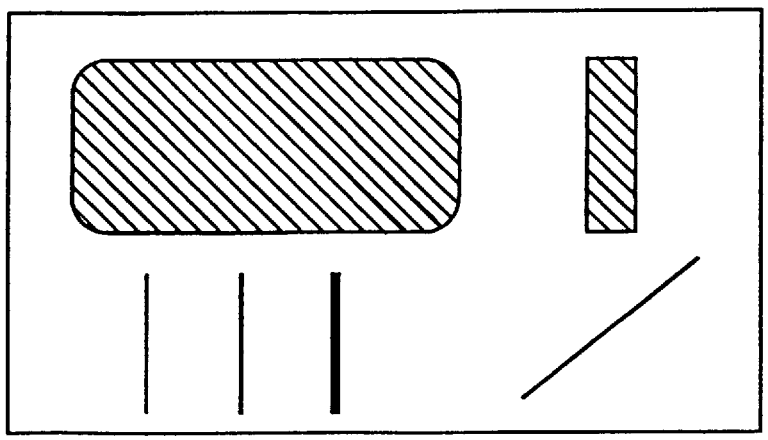
FIGS. 12A to 12C illustrate thin outline extraction according to a second embodiment of the present invention.

FIG. 12A shows original image data to be reduced ½ in the raster direction and ½ in the column direction.

Figure 12B:
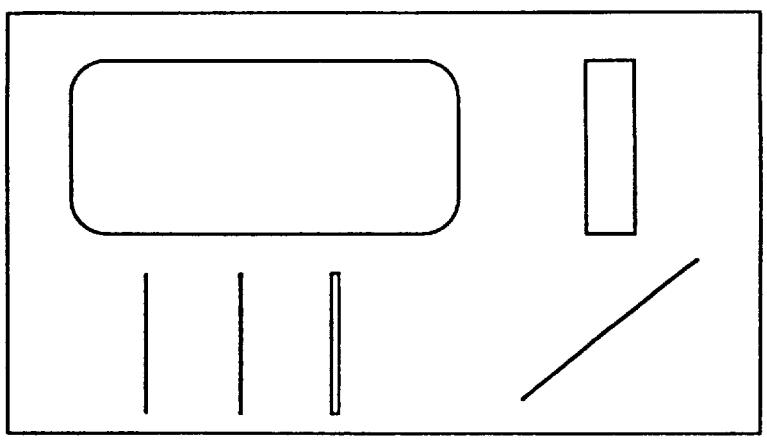
Figure 12C:
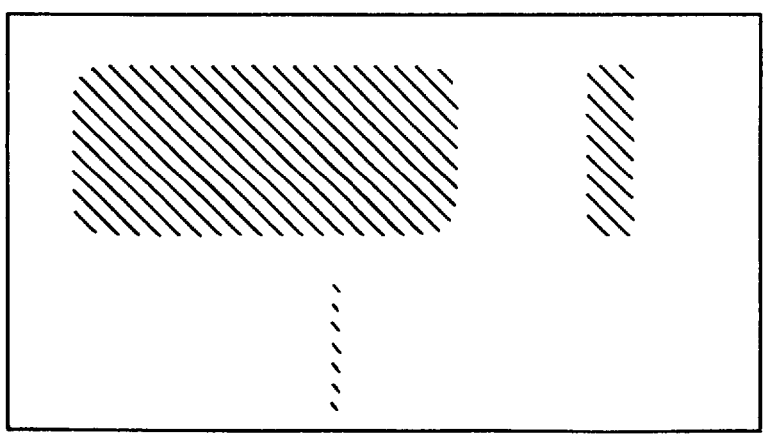

Note that to assist the understanding of the relation between the image data in FIGS. 12A to 12C and the reduced image data in FIGS. 13B to 13D, FIG. 13A shows the same original image data as shown in FIG. 12A.

Figure 13A:
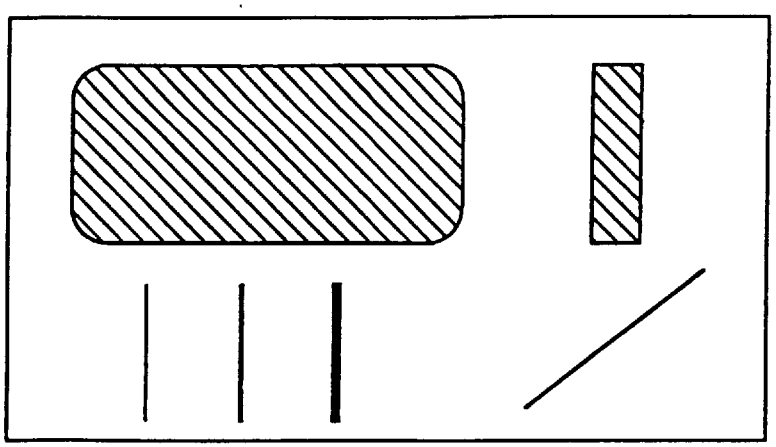
FIGS. 13A to 13D illustrate thin-line/outline reduction according to the second embodiment.
Figure 13B:
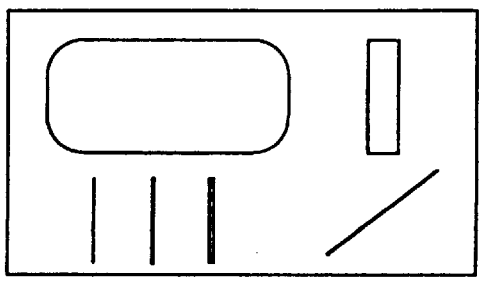

The original image data in FIG. 12A is stored in the image buffer 5. The thin-line/outline extractor 22 extracts the thin lines and outlines of the original image data as shown in FIG. 12B. The image size changer B 24 thins the extracted thin lines with a simple mask pattern such as a grid mask pattern into a ½ size data as shown in FIG. 13B, and stores the reduced image data into the memory B 26. If the original data consists of only thin lines and outlines, i.e., the original data contains no closed area which is surrounded by a thin line/outline, the thinning by the image size changer B 24 using the simple mask pattern can conserve the image quality.

Next, the closed area extractor 21 extracts closed areas as shown in FIG. 12C. Then, the image size changer A 23 thins the data using a mask pattern generated by pseudo-random number in the same mask-pattern generation method as that in the first embodiment to ½ data, and stores the reduced data into the memory A 25. Note that the image size changer A 23 may perform reduction upon the original image in FIG. 12A without closed-area extraction by the closed area extractor 21.

Figure 13C:
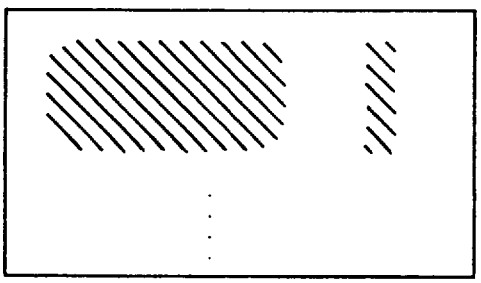
Figure 13D:
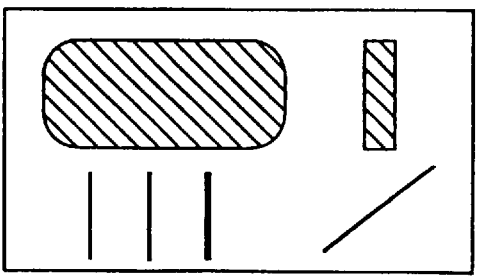

Next, the synthesizer 27 performs OR processing between the reduced image of thin lines and outlines in FIG. 13B stored in the memory B 26 and the reduced image of closed areas in FIG. 13C stored in the memory A25, to generate a ½ image of the original image as shown in FIG. 13D.

Figure 22:
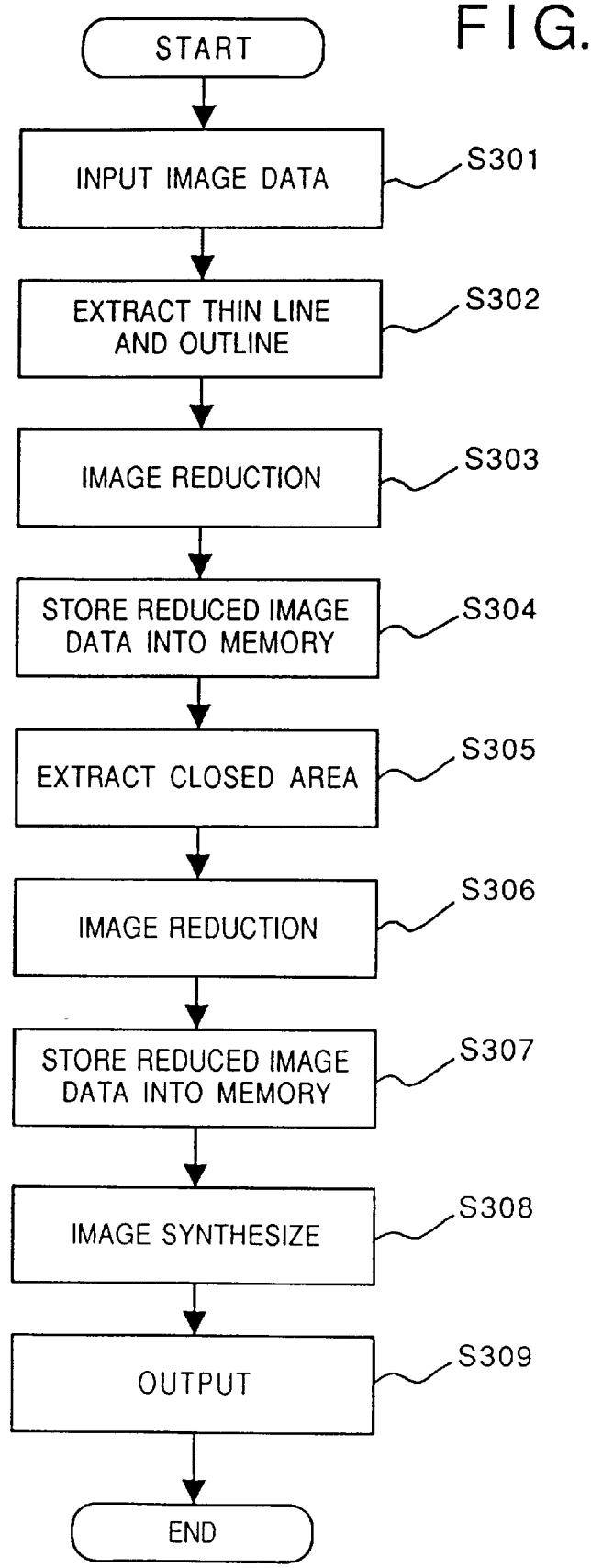
FIG. 22 is a flowchart showing the image reduction according to the second embodiment.

FIG. 22 is a flowchart showing the reduction processing according to the second embodiment. In step S301, image data is developed (FIG. 12A) in the image buffer. In step S302, thin lines and outlines are extracted (FIG. 12B) by the thin-line/outline extractor 22. In step S303, masking is performed upon the extracted data by the image size changer B 24 using a mask pattern from the DRAM 8, and in step S304, the image data after the masking (FIG. 13B) is stored into the memory B 26.

Next, in step S305, closed areas are extracted (FIG. 12C) from the image data in the image buffer 5 by the closed area extractor 21. In step S306, masking is performed upon the extracted data by the image size changer A 23 using a mask pattern from the DRAM 8, and in step S307, the image data after the masking (FIG. 13C) is stored into the memory A25.

Then the process proceeds to step S308 in which OR processing between the data in the memory A 25 and the data in the memory B 26 is performed by the synthesizer 27, and the synthesized data is stored into the print buffer 9. In step S309, the data in the print buffer 9 is outputted to the print head 10.

As described above, according to the second embodiment, a thin-line/outline portion and a closed area portion are separately processed using respective appropriate reduction methods, i.e., a reduction method maintaining thin lines and outlines is used for the thin-line/outline portions, and a reduction method conserving density is used for the closed area portion. This conserves tonality in reduction of gray-scale images, and conserves color hue and tonality in reduction of color-images. Thus, the second embodiment can provide reduced images of excellent tonality and color hue with well-maintained thin lines.

In the second embodiment, thin lines and outlines are initially processed with a simple and high-speed reduction method, next, closed areas are processed with another method for the closed areas, then OR processing between the reduced thin lines and outlines and the closed areas is performed. This omits continuously judging whether the processed area is a thin-line/outline or closed area, during the overall processing. Accordingly, compared with processing thin lines and outlines together with closed areas, the processing of the present embodiment can be made at a higher speed.

Note that the above-described thin-line/outline extraction method and closed area extraction method can be attained by using well-known software or hardware.

[Third Embodiment]

The second embodiment provides a method maintaining thin-line/outline portions as well as hue and density conservability of the method of the first embodiment. The present invention is not limited to these embodiments in printing for representing halftone by changing the ratio of color dot ratio within a unit area, but it may be applied to printing representing halftone by density change such as a multi-dot printing method and an image printing using inks of different densities. The latter printing according to a third embodiment conserving color hue and tonality will be described below.

Note that the printer according to the third embodiment has the same construction in FIG. 1 of the first embodiment, and detailed explanation of the construction printer of the third embodiment will be omitted.

In the first and second embodiments, image printing is made by a method representing halftone by changing color dot ratio per a unit area. When original image data is reduced, the tonality of the original image data can be conserved by using a mask pattern, generated using pseudo-random number so as to have the same color dot ratio as that of the original image data, according to the reduction ratio.

However, in image printing representing halftone by density change, a density is determined by the combination of dot density of higher density ink and that of lower density ink. Accordingly, two methods are provided to attain reduction conserving the tonality of an original image data. The first method is simply thinning the dot density of the higher density ink and the lower density ink simultaneously using one mask pattern generated using a pseudo-random number, as the thinning in the first and second embodiments. The second method is thinning where tonality conservability and color hue conservability are further improved.

The first method is basically the same as the method representing halftone by changing color dot ratio per unit area even in the printing method representing halftone by density change using inks of different densities. If the number of dots is simply reduced by a mask pattern, the tonality may be subtly degraded.

On the other hand, in the second method, upon generation of a mask pattern according to a reduction ratio using pseudo-random numbers, mask patterns are separately generated for the dots of higher density ink and the dots of lower density ink. The reduction is respectively performed for the dots of higher density ink and the dots of lower density ink, and the respective reduction results are OR-processed. Thus, the tonality of the original image data can be conserved.

In a case where the reduction ratio is high and the size of a mask pattern is small and as a result, the density of a printed image becomes higher, the second method using separately-generated mask patterns can subtly increase the thinning ratio of the dots of higher density ink.

In a case where the thinning ratios are incomplete depending upon the reduction ratio, the thinning ratio of the dots of higher density ink may be increased, while the thinning ratio of the dots of lower density ink may be decreased, or vice versa, otherwise, the number of dots to be printed by the lower density ink may be increased. Thus, flexible processing as desired by users can be made.

The same reduction methods are applicable to a multi-dot printing method. In the multi-dot printing method, ink of a predetermined density is discharged plural times at approximately the same portion to obtain halftone by increasing the density of the portion. The first method is simply thinning all the dots using one mask pattern. Further, the second method is separately generating mask patterns based on the reduction ratio using a pseudo-random number in accordance with the number of dots overlapped at one portion, and reducing groups of portions having the same number of overlapped dots using the corresponding mask patterns. Thereafter, the reduced images of the respective groups are OR—processed and a final reduced image is obtained.

As described above, according to the third embodiment, in image printing method representing halftone by density change such as multi-dot printing or method using inks of different densities, reduction processing of improved tonality conservability can be provided.

[Fourth Embodiment]

Next, a fourth embodiment of the present invention will be described as an example of resolution conversion.

In resolution conversion, a regular pattern also causes change of color hue. For this reason, in the fourth embodiment, resolution conversion is made using a pseudo-random number.

Next, a general resolution conversion method for converting a 160 dpi (dot per inch) image to a 360 dpi image will be described with reference to FIGS. 14A, 14B, 15A and 15B.

Upon converting 160 dpi resolution to 360 dpi resolution, the magnification ratio on an image buffer is 4:9. The magnification with respect to one dot area is 2.25×2.25= 5.05, which inconveniently includes non-integer ratios. This may change the color hue depending upon processing of the numbers having decimal places.

Figure 14A:
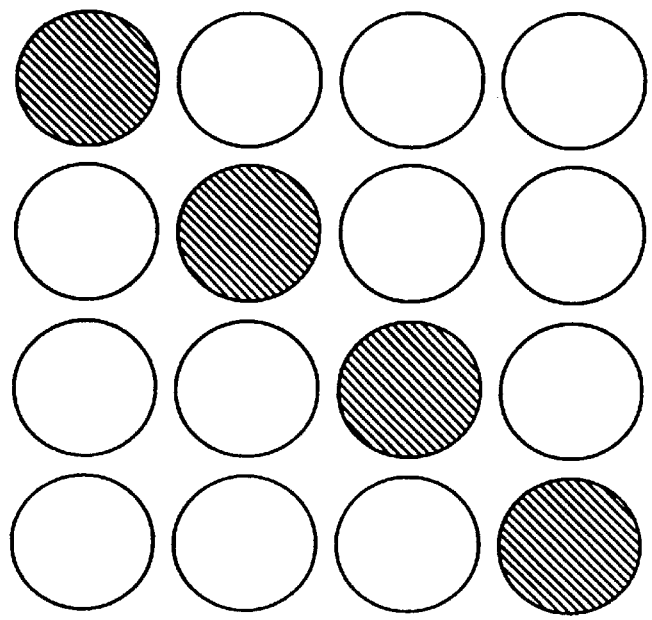
FIGS. 14A and 14B illustrate conventional resolution conversion in a fourth embodiment of the present invention.
Figure 14B:
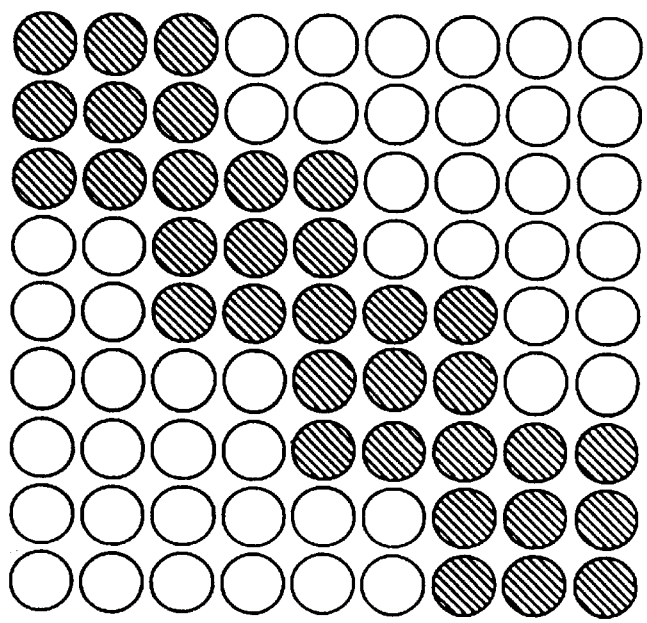

FIG. 14A shows a 4×4 dot block of a 160 dpi monochromatic original image data. FIG. 14B shows a 9×9 block of a 360 dpi image data obtained from resolution conversion of the original image data in FIG. 14A.

The area ratio calculated from the number of dots and the number of blank portions of the image data in FIG. 14A is 4:12, i.e., 1:3. On the other hand, the area ratio in FIG. 14B is 33:48, i.e., 1:1.45. Apparently the image in FIG. 14B obtained from the resolution conversion has a density, i.e., color hue, different from that of the original image data.

Figure 18:
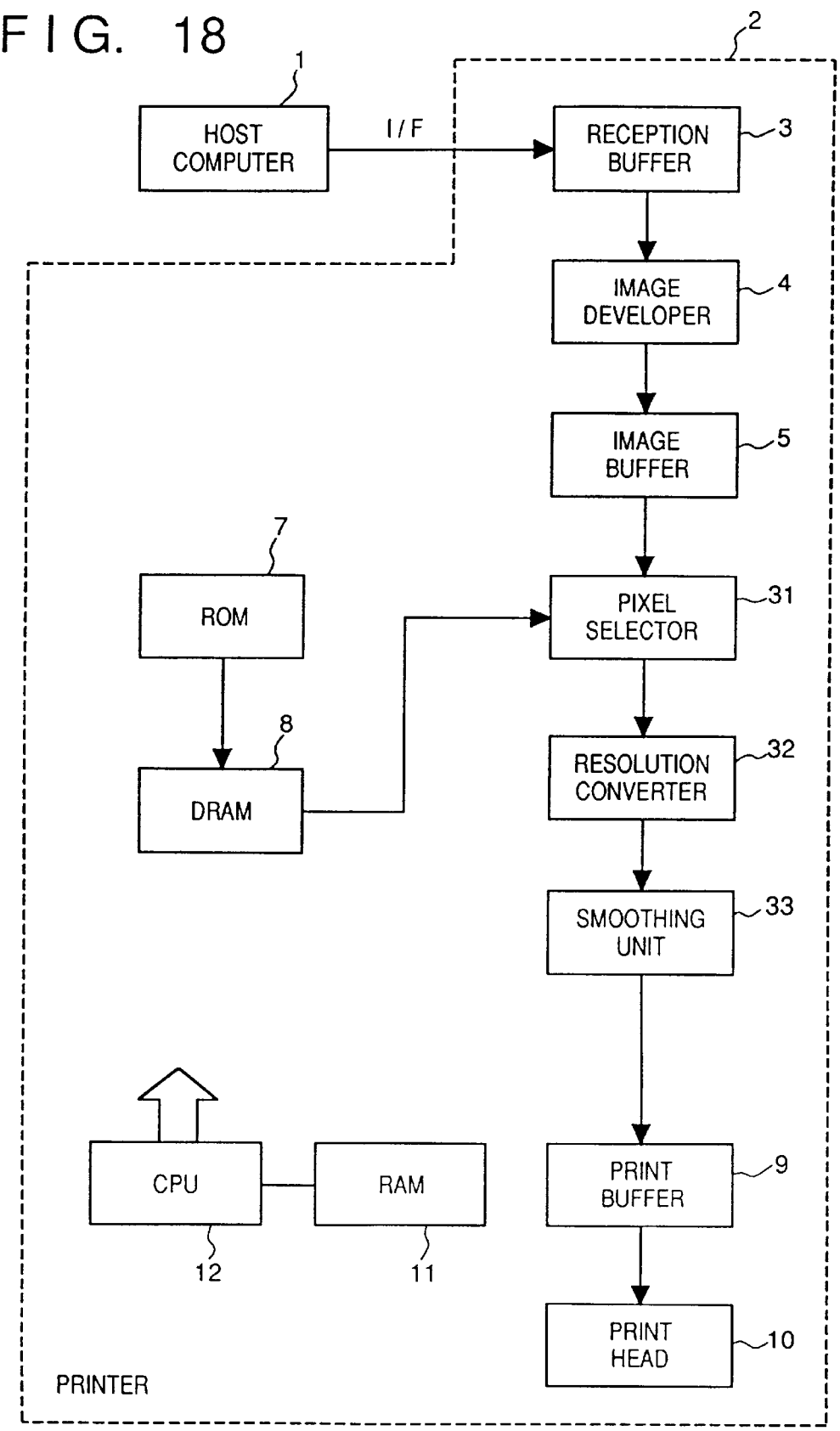
FIG. 18 is a block diagram showing the configuration of an image processing apparatus according to the fourth embodiment.

FIG. 18 shows the configuration of a printer, capable of resolution conversion, according to the fourth embodiment. In FIG. 18, the elements corresponding to those in FIG. 1 of the first embodiment have the same reference numerals, and the explanation of these elements will be omitted. In FIG. 18, numeral 31 denotes a pixel selector; 32, a resolution converter; and 33, a smoothing unit.

The resolution conversion processing according to the fourth embodiment will be described in detail with reference to FIGS. 15A and 15B.

Figure 15A:
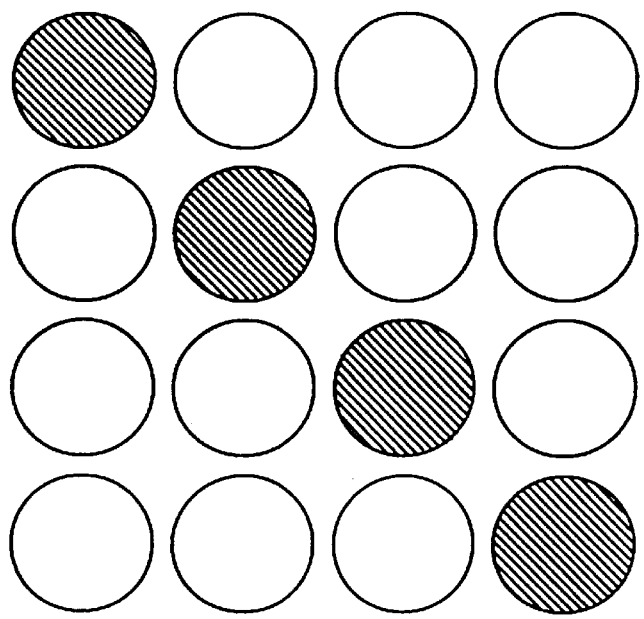
FIGS. 15A and 15B illustrate resolution conversion using pseudo-random numbers according to the fourth embodiment.

FIG. 15A shows a 4×4 dot block of a monochromatic 160 dpi original image data similar to the data in FIG. 14A. FIG. 15B shows a 9×9 dot block of a 360 dpi image data obtained from resolution conversion of the original image data in FIG. 15A.

In the fourth embodiment, initially the image data in FIG. 15A is stored in the image buffer 5. The pixel selector 31 selects pixels of the image data in the image buffer 5 at the ratio of one dot per eight dots in the column direction in accordance with a pattern transferred from the DRAM 8.

Then, the resolution converter 32 performs predetermined resolution conversion, and further performs OR processing between the selected pixels and their adjacent pixels. Thus, four dot data are converted into nine dot data.

Figure 15B:
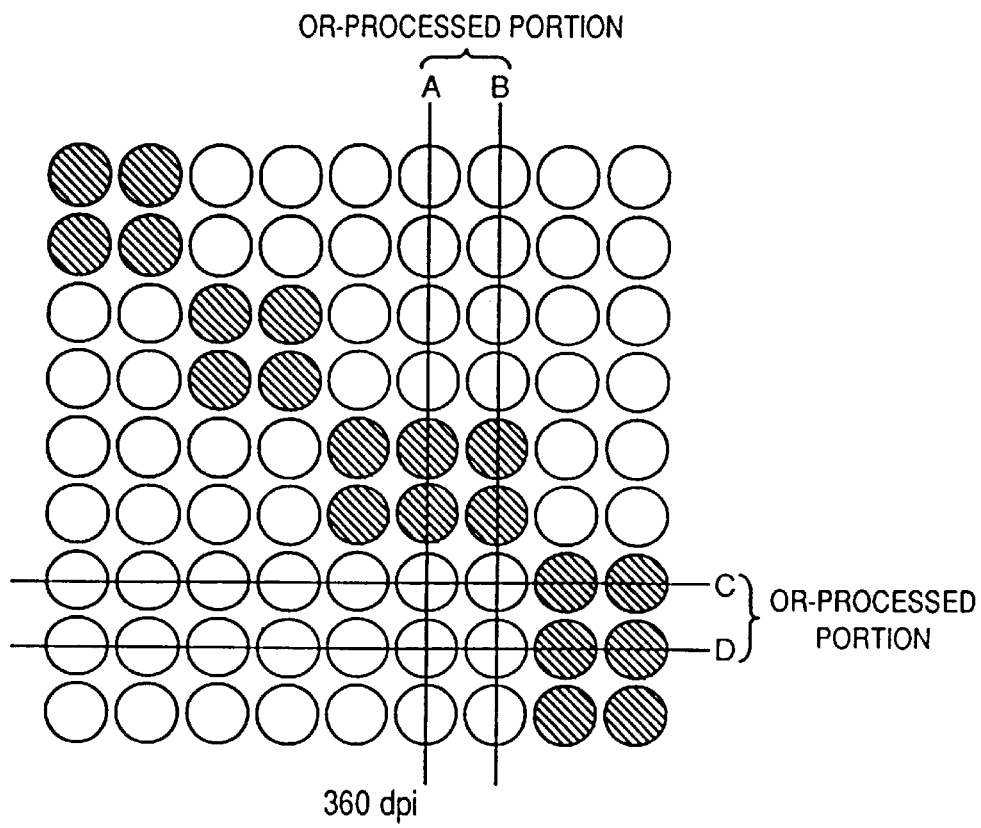

Next, the resolution converter performs similar processings with respect to the raster direction, thereafter, outputs resolution-converted image data as shown in FIG. 15B.

More specifically, in FIG. 15B, a dot array A is selected among the eight-dot arrays doubled in the column direction. Then the selected array A is OR— processed with the right dots, and a dot array B is added to the image data. In the raster direction, the same processing is performed (dot array C and D).

The area ratio in FIG. 15B calculated from the number of dots and the number of blank portions is 20:61, i.e., 1:3.05. This approximately corresponds to the area ratio of the image data in FIG. 15A.

Next, smoothing processing by the smoothing unit 32 will be described with reference to FIGS. 16A and 16B. A 160 dpi original image data in FIG. 16A is converted to a 360 dpi image data as shown in FIG. 15B, then processed by the smoothing unit 32 with a well-known smoothing technique, and image data as shown in FIG. 16B is obtained.

Figure 16A:
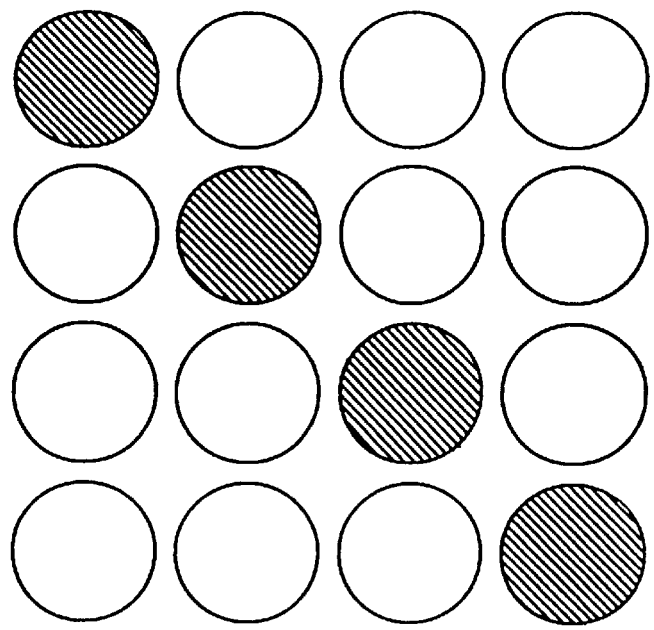
FIGS. 16A and 16B illustrate smoothing processed image data after the resolution conversion in FIGS. 15A and 15B.
Figure 16B:
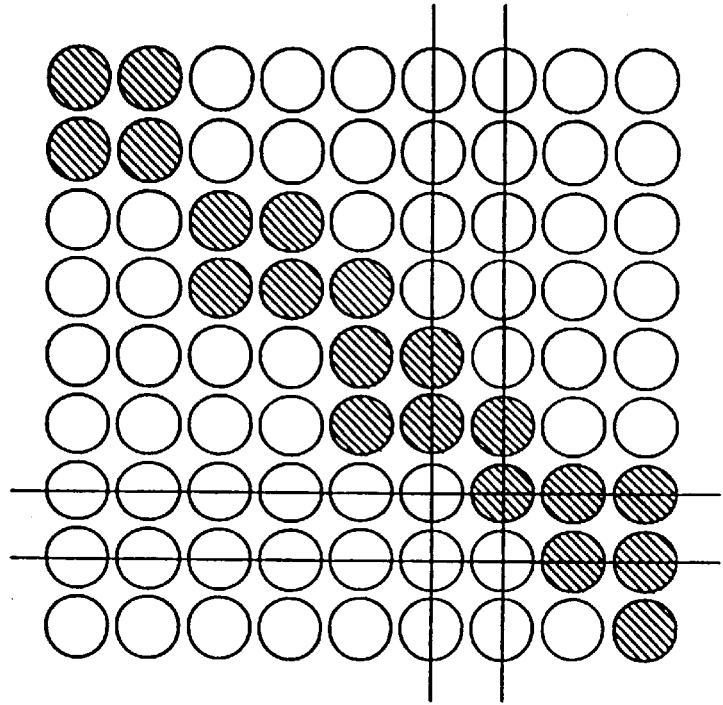

That is, the resolution conversion of the fourth embodiment obtains an image as shown in FIG. 16B from an original image as shown in FIG. 16A.

Figure 23:
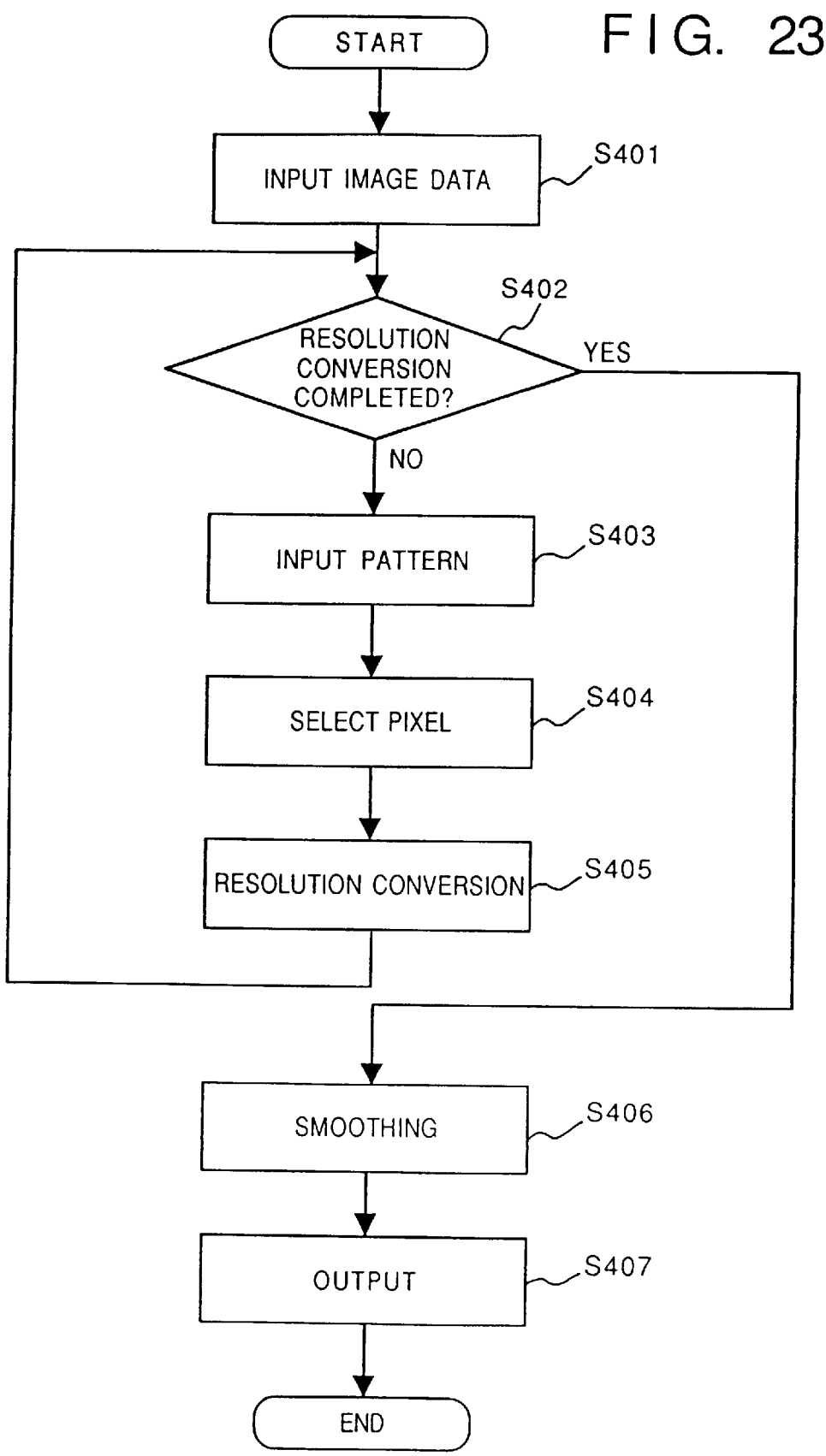
FIG. 23 is a flowchart showing the resolution conversion according to the fourth embodiment.

FIG. 23 is a flowchart showing the resolution conversion processing according to the fourth embodiment. In step S401, image data is developed (FIG. 15A) in the image buffer 5. In step S402, whether or not the resolution conversion with respect to the overall image data stored in the image buffer 5 has been completed is determined. If NO, the process proceeds to step S403, in which a pattern for determining pixels is inputted from the DRAM 8. In step S404, pixels are selected by the pixel selector 31. In step S405, the resolution conversion is performed while OR-processing between the selected pixels and their adjacent pixels is performed (FIG. 15B). The process returns to step S402, to repeat the above operations until the resolution conversion with respect to the overall image data is completed.

In step S402, if it is determined that the resolution conversion with respect to the overall image data has been completed, smoothing processing is performed in step S406, and the result of the smoothing (FIG. 16B) is stored into the print buffer 9. In step S407, the stored data is outputted to the print head 10.

In a case where 360 dpi image data is converted to 160 dpi image data, the processing may be similar to the reduction processing in the first embodiment.

That is, a mask pattern is generated using a pseudo random number in accordance with 4/9 thinning ratio, then data thinned using this mask pattern is rearranged and outputted. Thus, the resolution conversion from 360 dpi to 160 dpi is attained.

Otherwise, similar to the above resolution conversion from 160 dpi to 360 dpi, pixels may be selected from the 360 dpi data in the column direction, and AND processing may be performed between the selected pixels and their adjacent pixels. Thus, nine dot data can be converted to four dot data. In the raster direction, the same processing is made. Note that this is applicable to reduction processing.

As described above, the resolution conversion according to the fourth embodiment avoids considerable change of the number of dots and the number of blank portions per unit area, thus preventing considerable change of color density.

Note that the fourth embodiment is an example of resolution conversion, however, it is applicable to enlargement processing.

Further, a mask pattern generated using a pseudo random number as described in the first embodiment may be used for resolution conversion from a low resolution to a higher resolution or image enlargement. For example, as shown in the fourth embodiment, OR—processing between pixels selected with such a mask pattern and the adjacent pixels may be performed.

In the first to fourth embodiments, a mask pattern generated using a pseudo-random number is written into the ROM 7 of the printer in advance, and it is transferred to the DRAM when it is used. However, the present invention is not limited to this arrangement. In all the embodiments, such mask pattern may be arbitrarily generated using any hardware or software having a pseudo-random number generating function as shown in FIG. 19.

Further, any type of printer may be employed as the printer 2 in the embodiments, for example, printers such as a laser-beam printer, thermal printer and a bubble-jet type printer utilizing film-boiling by thermal energy for discharging ink droplets and a thermal-transfer type printer. Further, the printer 2 is applicable to image processing apparatuses such as a copying machine and a facsimile apparatus.

As described above, according to the present invention, image enlargement/reduction or resolution conversion of original image using a pattern for resolution conversion, generated with a pseudo-random number, conserves the respective color densities, and thus enables image processing conserving the color hue and tonality of the original image.

Further, different appropriate reduction methods are employed for separate processings on thin-line/outline portions and closed area portions, i.e., with respect to the thin-line/outline portions, a method maintaining the thin lines or outlines is employed, while with respect to the closed area portions, a method conserving density is employed. Accordingly, image processing excellent in thin-line maintainability, tonality conservability and color hue conservability can be performed at a high speed.

Further, in image printing method representing halftone by density change such as a multi-dot printing method or a printing using inks of different densities, the present invention enables reduction processing where tonality conservability is improved.

Further, the present invention allows ordinary users as well as a skilled user the most appropriate image processing.

The present invention can be applied to a system constituted by a plurality of devices, or to an apparatus comprising a single device. Furthermore, the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing method comprising:

an input step of inputting image data;

a conversion step of masking the image data inputted in said input step using a mask pattern generated by determining dots of a predetermined number to be masked within a block having a predetermined number of pixels in accordance with a pseudo-random number, wherein said conversion step includes adding or thinning of image data pixels;

an output step of outputting the image data masked in said conversion step;

a pseudo-random number generation step of generating the pseudo-random number; and a mask pattern generation step of generating the mask pattern using the pseudo-random number generated in said pseudo-random number generation step, wherein individual pixels within the mask pattern that determine whether or not to mask the pixels of image data are generated pseudo-randomly.

2. The method according to claim 1, wherein the mask pattern is pre-stored.

3. An image processing method comprising:

an input step of inputting image data;

a conversion step of masking the image data inputted in said input step using a mask pattern generated by determining dots of a predetermined number to be masked within a block having a predetermined number of pixels in accordance with a pseudo-random number, wherein said conversion step includes adding or thinning of image data pixels; and an output step of outputting the image data masked in said conversion step, wherein the mask pattern is changed in accordance with a conversion ratio used in said conversion step, and the individual pixels within the mask pattern that determine whether or not to mask the image data are generated pseudo-randomly.

4. The method according to claim 3, wherein the mask pattern is pre-stored.

5. An image processing method comprising:

an input step of inputting image data;

a conversion step of masking the image data inputted in said input step using a mask pattern generated by determining dots of a predetermined number to be masked within a block having a predetermined number of pixels in accordance with a pseudo-random number; and an output step of outputting the image data masked in said conversion step, wherein, in said conversion step, if the image data is represented in a plurality of colors, masking is performed separately on each color component, and upon each masking, a mask pattern for at least one color component is different from another mask pattern for another color component, and the individual pixels within the mask pattern that determine whether or not to mask the image data are generated pseudo-randomly.

6. An image processing method comprising:

an input step of inputting image data;

a conversion step of masking the image data inputted in said input step using a mask pattern generated by determining dots of a predetermined number to be masked within a block having a predetermined number of pixels in accordance with a pseudo-random number; and an output step of outputting the image data masked in said conversion step, wherein, in said conversion step, if the image data is represented in accordance with a printing method for representing halftone by density change, masking is performed separately by each density level, and upon each masking, a mask pattern for at least one density is different from another mask pattern for another density level, and the individual pixels within the mask pattern that determine whether or not to mask the image data are generated pseudo-randomly.

7. An image processing method comprising:

an input step of inputting image data;

a thin-line extraction step of extracting a thin line/outline from the image data;

a closed area extraction step of extracting a closed area from the image data;

a first conversion step of thinning the thin line/outline extracted in said thin-line extraction step;

a second conversion step, different than said first conversion step, of masking the closed area extracted in said closed area extraction step using a mask pattern generated by determining dots of a predetermined number to be masked within a block having a predetermined number of pixels in accordance with a pseudo-random number;

a synthesizing step of synthesizing image data by OR-processing between the image data converted in said first conversion step and the image data masked in said second conversion step; and an output step of outputting the image data synthesized in said synthesizing step, wherein individual pixels within the mask pattern that determine whether or not to mask the closed area are generated pseudo-randomly.

8. An image processing method comprising:

an input step of inputting image data;

a selection individual step of selecting pixels from the image data inputted in said input step in accordance with a pattern which decides whether or not to add the pixels at random, pixel by pixel, the pattern being generated using a pseudo-random number;

a conversion step of adding pixels by referring to pixels adjacent to the pixels selected in said selection step; and an output step of outputting the image data where pixels are added in said conversion step, wherein, in said conversion step, the addition of pixels is made by OR-processing between the pixels selected in said selection step and the pixels adjacent to the selected pixels.

9. The method according to claim 8, wherein the pattern is pre-stored.

10. The method according to claim 8, further comprising a pseudo-random number generation step of generating a pseudo-random number and a mask pattern generation step of generating the mask pattern using the pseudo-random number generated in said pseudo-random number generation step.

11. The method according to claim 8, wherein the mask pattern is changed in accordance with a conversion ratio used in said conversion step.

12. An image processing apparatus comprising:

input means for inputting image data;

storage means for storing a mask pattern generated by determining dots of a predetermined number to be masked within a block having a predetermined number of pixels in accordance with a pseudo-random number;

conversion means for masking the image data inputted by said input means using the mask pattern stored in said storage means, wherein processing by said conversion means includes adding or thinning of image data pixels and output means for outputting the image data masked by said conversion means;

pseudo-random number generation means for generating a pseudo-random number; and mask pattern generation means for generating the mask pattern using the pseudo-random number generated by said pseudo-random number generation means, wherein individual pixels within the mask pattern that determine whether or not to mask the pixels of image data are generated pseudo-randomly.

13. The apparatus according to claim 12, wherein said storage means pre-stores the mask pattern.

14. The apparatus according to claim 12, wherein said output means is an ink-jet printer which performs printing by discharging ink.

15. The apparatus according to claim 12, wherein said output means is an ink-jet printer comprising a print head for discharging ink utilizing thermal energy and a thermal energy converter for generating thermal energy applied to the ink.

16. An image processing apparatus comprising:

input means for inputting image data;

storage means for storing a mask pattern generated by determining dots of a predetermined number to be masked within a block having a predetermined number of pixels in accordance with a pseudo-random number;

conversion means for masking the image data inputted by said input means using the mask pattern stored in said storage means, wherein processing by said conversion means includes adding or thinning of image data pixels; and output means for outputting the image data masked by said conversion means, wherein the mask pattern is changed in accordance with a conversion ratio used by said conversion means, and the individual pixels within the mask pattern that determine whether or not to mask the image data are generated pseudo-randomly.

17. The apparatus according to claim 16, wherein said storage means pre-stores the mask pattern.

18. The apparatus according to claim 16, wherein said output means is an ink-jet printer which performs printing by discharging ink.

19. The apparatus according to claim 16, wherein said output means is an ink-jet printer comprising a print head for discharging ink utilizing thermal energy and a thermal energy converter for generating thermal energy applied to the ink.

20. An image processing apparatus comprising:

input means for inputting image data;

storage means for storing a mask pattern generated by determining dots of a predetermined number to be masked within a block having a predetermined number of pixels in accordance with a pseudo-random number;

conversion means for masking the image data inputted by said input means using the mask pattern stored in said storage means; and output means for outputting the image data masked by said conversion means, wherein if the image data is represented in a plurality of colors, said conversion means performs masking separately for each color component, and upon each masking, a mask pattern for at least one color component is different from another mask pattern for another color component, and the individual pixels within the mask pattern that determine whether or not to mask the image data are generated pseudo-randomly.

21. An image processing apparatus comprising:

input means for inputting image data;

storage means for storing a mask pattern generated by determining dots of a predetermined number to be masked within a block having a predetermined number of pixels in accordance with a pseudo-random number;

conversion means for masking the image data inputted by said input means using the mask pattern stored in said storage means; and output means for outputting the image data masked by said conversion means, wherein if the image data is represented in accordance with a printing method for representing halftone by density change, said conversion means performs masking separately for each density level, and upon each masking, a mask pattern for at least one density is different from another mask pattern for another density level, and the individual pixels within the mask pattern that determine whether or not to mask the image data are generated pseudo-randomly.

22. An image processing apparatus comprising:

input means for inputting image data;

thin-line extraction means for extracting a thin line/outline from the image data;

closed area extraction means for extracting a closed area from the image data;

first conversion means for thinning the thin-line/outline extracted by said thin-line/outline extraction means;

storage means for storing a mask pattern generated by determining dots of a predetermined number to be masked within a block having a predetermined number of pixels in accordance with pseudo-random number;

second conversion means, different than said first conversion means for masking the closed area extracted by said closed area extraction means using the mask pattern stored in said storage means;

synthesizing means for synthesizing image data by OR-processing between the image data converted by said first conversion means and the image data masked by said second conversion means; and output means for outputting the image data synthesized by said synthesizing means, wherein individual pixels within the mask pattern that determine whether or not to mask the closed area are generated pseudo-randomly.

23. An image processing apparatus comprising:

input means for inputting image data;

storage means for storing a pattern generated using a pseudo-random number;

selection means for selecting individual pixels from the image data inputted by said input means in accordance with the pattern, which decides whether or not to add the pixels at random, pixel by pixel, the pattern being stored in said storage means;

conversion means for adding pixels by referring to pixels adjacent to the pixels selected by said selection means; and output means for outputting the image data where pixels are added by said conversion means, wherein said conversion means adds pixels by OR-processing between the pixels selected by said selection means and the pixels adjacent to the selected pixels.

24. The apparatus according to claim 23, wherein said storage means pre-stores the pattern.

25. The apparatus according to claim 23, further comprising pseudo-random number generation means for generating a pseudo-random number and mask pattern generation means for generating the mask pattern using the pseudo-random number generated by said pseudo-random number generation means.

26. The apparatus according to claim 23, wherein the mask pattern is changed in accordance with a conversion ratio used by said conversion means.

* * * * *

UNITED STATES PATENT AND TRADEMARK OFFICE
CERTIFICATE OF CORRECTION

PATENT NO.   : 6,118,457
DATED        : September 12, 2000
INVENTOR(S)  : Ohtsuka et al.

It is certified that error appears in the above-identified patent and that said Letters Patent is hereby corrected as shown below:

Title page,

Under Foreign Patent Documents:
"5155040" should read -- 5-155040 --.

Column 1,
Line 47, "pattern" should read -- pattern, --;
Line 54, "have" should read -- has --;
Line 58, "require" should be deleted; and
Line 65, "enables" should read -- enable --.

Column 3,
Line 63, "¶However," should read -- However, --.

Column 6,
Line 10, "positions 1" should read -- positions $\ell$ --;
Line 11, "(1,r)." should read -- -- $(\ell,r)$. --; and
Line 16, "pseudo– random" should read -- pseudo-random --.

Column 7,
Line 23, "number" should read -- numbers --.

Column 8,
Line 40, "number" should read -- numbers --.

Column 9,
Line 44, "printer" should read -- of the printer --; and
Line 51, "number" should read -- numbers --.

Column 12,
Line 4, "pseudo random," should read -- pseudo-random --;
Line 23, "pseudo random" should read -- pseudo-random --; and
Line 61, "in" should read -- an --.

UNITED STATES PATENT AND TRADEMARK OFFICE
CERTIFICATE OF CORRECTION

PATENT NO. : 6,118,457
DATED : September 12, 2000
INVENTOR(S) : Ohtsuka et al.

It is certified that error appears in the above-identified patent and that said Letters Patent is hereby corrected as shown below:

Column 14,
Line 51, "pixels" should read -- individual pixels --.

Column 15,
Line 19, "pixels" should read -- pixels; --.

Signed and Sealed this

Thirtieth Day of October, 2001

Attest:

NICHOLAS P. GODICI
Attesting Officer *Acting Director of the United States Patent and Trademark Office*